United States Patent
Matsuno et al.

(10) Patent No.: US 10,991,971 B2
(45) Date of Patent: Apr. 27, 2021

(54) NEGATIVE ELECTRODE ACTIVE MATERIAL, MIXED NEGATIVE ELECTRODE ACTIVE MATERIAL, NEGATIVE ELECTRODE FOR NONAQUEOUS ELECTROLYTE SECONDARY BATTERY, LITHIUM ION SECONDARY BATTERY, AND, PRODUCTION METHOD OF NEGATIVE ELECTRODE ACTIVE MATERIAL

(71) Applicant: SHIN-ETSU CHEMICAL CO., LTD., Tokyo (JP)

(72) Inventors: Takumi Matsuno, Annaka (JP);
Takakazu Hirose, Annaka (JP);
Hiromichi Kamo, Takasaki (JP);
Masahiro Furuya, Takasaki (JP);
Hidekazu Awano, Takasaki (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 248 days.

(21) Appl. No.: 15/768,660

(22) PCT Filed: Oct. 24, 2016

(86) PCT No.: PCT/JP2016/004663
§ 371 (c)(1),
(2) Date: Apr. 16, 2018

(87) PCT Pub. No.: WO2017/085902
PCT Pub. Date: May 26, 2017

(65) Prior Publication Data
US 2018/0287193 A1 Oct. 4, 2018

(30) Foreign Application Priority Data

Nov. 17, 2015 (JP) .............................. JP2015-224343

(51) Int. Cl.
*H01M 4/131* (2010.01)
*H01M 4/134* (2010.01)
(Continued)

(52) U.S. Cl.
CPC ....... *H01M 10/0525* (2013.01); *H01M 4/131* (2013.01); *H01M 4/134* (2013.01);
(Continued)

(58) Field of Classification Search
CPC ........ H01M 10/00; H01M 4/00; H01M 4/134; H01M 4/386
See application file for complete search history.

(56) References Cited

U.S. PATENT DOCUMENTS

| 5,395,711 A | 3/1995 | Tahara et al. |
| 7,459,236 B2 | 12/2008 | Konishiike et al. |

(Continued)

FOREIGN PATENT DOCUMENTS

| CN | 1513922 A | 7/2004 |
| CN | 101038962 A | 9/2007 |

(Continued)

OTHER PUBLICATIONS

Hayashi et al. WO 2013/054481. Apr. 18, 2013. English translation. (Year: 2013).*

(Continued)

*Primary Examiner* — James Lee
(74) *Attorney, Agent, or Firm* — Oliff PLC

(57) ABSTRACT

The present disclosure relates to a negative electrode active material including: particles of negative electrode active material, wherein the particles of negative electrode active material contain particles of silicon compound containing a silicon compound ($SiO_x$: $0.55 \leq x \leq 1.6$), and the particles of silicon compound includes at least one or more kinds of $Li_2SiO_3$ and $Li_4SiO_4$; the particles of silicon compound (Continued)

contain nickel; and, a mass of the nickel to a mass of the particles of negative electrode active material is 2 mass ppm or more and 100 mass ppm or less. Thus, when used as the negative electrode active material of a secondary battery, a negative electrode active material capable of improving the initial charge/discharge characteristics and cycle characteristics is provided.

17 Claims, 2 Drawing Sheets

(51) Int. Cl.
*H01M 4/485* (2010.01)
*H01M 10/0525* (2010.01)
*H01M 4/139* (2010.01)
*H01M 4/36* (2006.01)
*H01M 4/38* (2006.01)
*H01M 4/583* (2010.01)
*H01M 4/66* (2006.01)
*H01M 10/0587* (2010.01)

(52) U.S. Cl.
CPC .......... *H01M 4/139* (2013.01); *H01M 4/364* (2013.01); *H01M 4/366* (2013.01); *H01M 4/386* (2013.01); *H01M 4/583* (2013.01); *H01M 4/663* (2013.01); *H01M 10/0587* (2013.01)

(56) References Cited

U.S. PATENT DOCUMENTS

| | | |
|---|---|---|
| 8,377,592 B2 | 2/2013 | Jeong et al. |
| 2003/0215711 A1* | 11/2003 | Aramata ............... B82Y 30/00 429/218.1 |
| 2006/0099507 A1 | 5/2006 | Kogetsu et al. |
| 2007/0218365 A1 | 9/2007 | Takezawa et al. |
| 2008/0176137 A1 | 7/2008 | Endo et al. |
| 2009/0202911 A1 | 8/2009 | Fukuoka et al. |
| 2010/0243951 A1* | 9/2010 | Watanabe ............. H01M 4/485 252/182.1 |
| 2014/0287315 A1* | 9/2014 | Troegel ............... H01M 4/0421 429/231.8 |
| 2015/0221950 A1 | 8/2015 | Minami et al. |

FOREIGN PATENT DOCUMENTS

| | | |
|---|---|---|
| CN | 104058404 A | 9/2014 |
| CN | 104603993 A | 5/2015 |
| JP | 2997741 B2 | 1/2000 |
| JP | 2001-185127 A | 7/2001 |
| JP | 2002-042806 A | 2/2002 |
| JP | 2004-349057 A | 12/2004 |
| JP | 2006-114454 A | 4/2006 |
| JP | 2006-164954 A | 6/2006 |
| JP | 2006-244813 A | 9/2006 |
| JP | 2007-234255 A | 9/2007 |
| JP | 2007-280926 A | 10/2007 |
| JP | 2008-177346 A | 7/2008 |
| JP | 2008-251369 A | 10/2008 |
| JP | 2008-282819 A | 11/2008 |
| JP | 2009-070825 A | 4/2009 |
| JP | 2009-205950 A | 9/2009 |
| JP | 2009-212074 A | 9/2009 |
| JP | 2010-3642 A | 1/2010 |
| WO | WO-2013054481 A1 * | 4/2013 ............ H01M 4/625 |

OTHER PUBLICATIONS

Nov. 22, 2016 International Search Report issued in International Patent Application No. PCT/JP2016/004663.
Jan. 15, 2020 Office Action issued in Taiwanese Patent Application No. 105135296.
Jul. 1, 2020 Office Action issued in Chinese Patent Application No. 201680066879.7.

* cited by examiner

[FIG. 1]
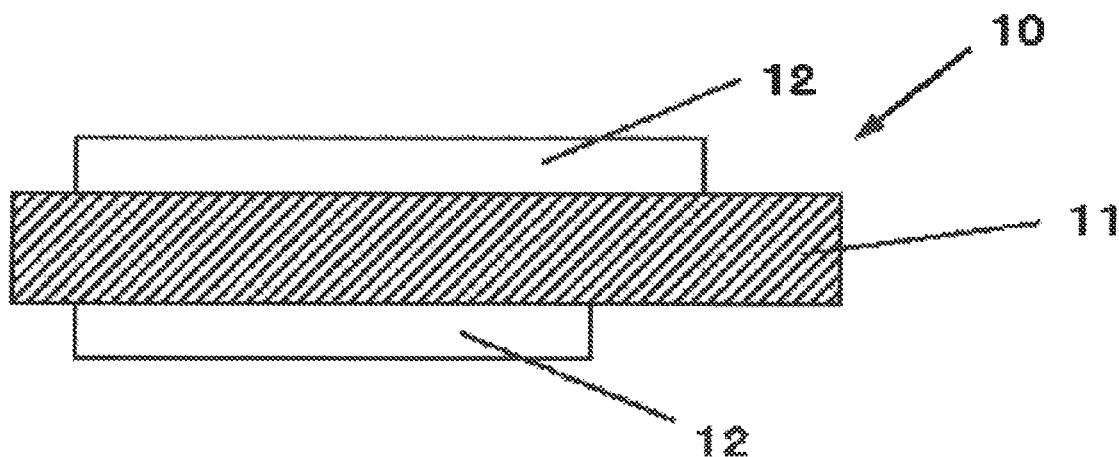
[FIG. 2]
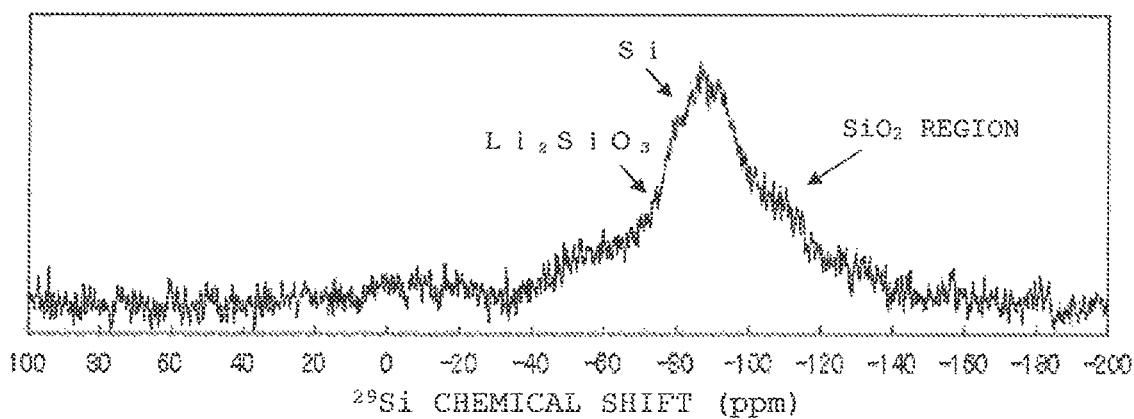
[FIG. 3]
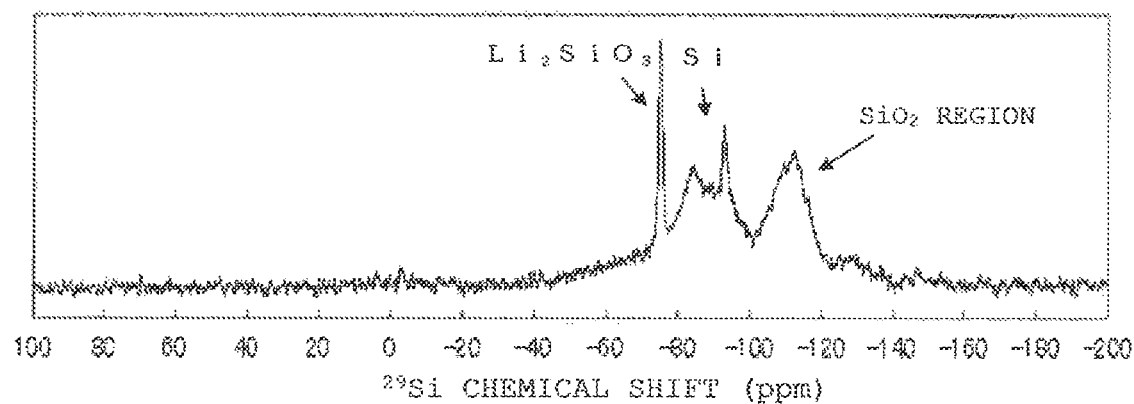

[FIG. 4]
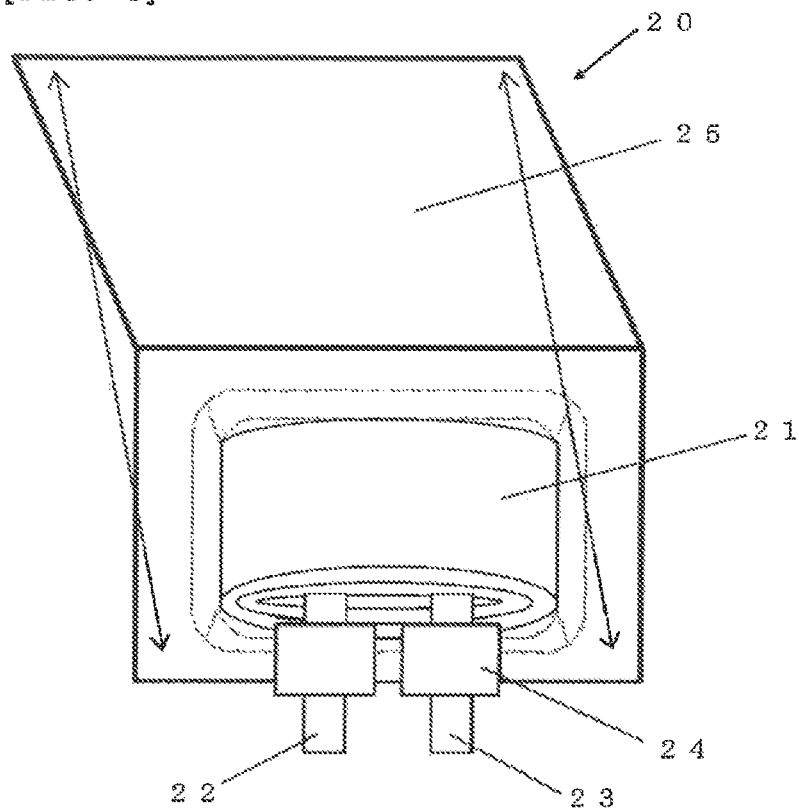
[FIG. 5]
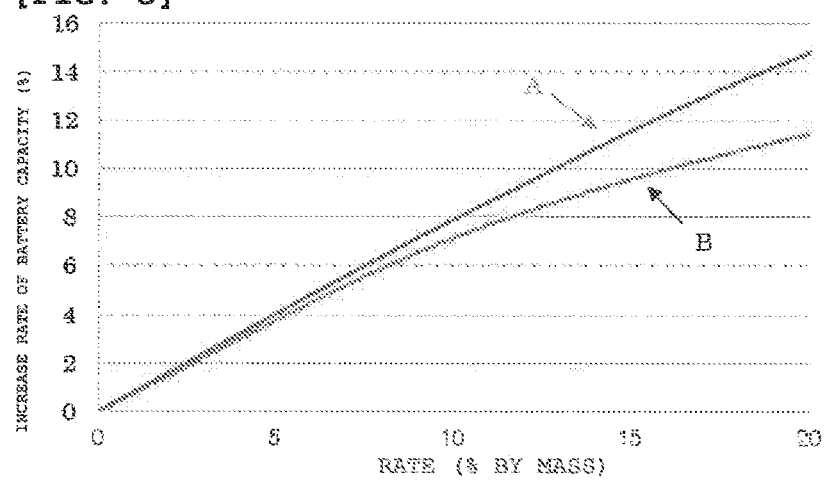

ND ACTIVE
MATERIAL, MIXED NEGATIVE
ELECTRODE ACTIVE MATERIAL,
NEGATIVE ELECTRODE FOR
NONAQUEOUS ELECTROLYTE
SECONDARY BATTERY, LITHIUM ION
SECONDARY BATTERY, AND,
PRODUCTION METHOD OF NEGATIVE
ELECTRODE ACTIVE MATERIAL

TECHNICAL FIELD

The present disclosure relates to a negative electrode active material, a mixed negative electrode active material, a negative electrode for non-aqueous electrolyte secondary batteries, a lithium ion secondary battery, and, a production method of a negative electrode active material.

BACKGROUND ART

In recent years, small-sized electronic devices represented by mobile terminals and the like have been widely spread and further down-sizing, lighter weight and longer life are strongly demanded. To a market demand like this, developments of secondary batteries capable of obtaining, in particular, a smaller size, a lighter weight and a higher energy density have been developed. The secondary batteries have been studied to apply also to, without limiting to small-sized electronic devices, large-sized electronic devices represented by automobiles and power-storage systems represented by houses or the like.

Among those, lithium-ion secondary batteries are easy to reduce the size and increase the capacity and have higher energy density than those of lead or nickel-cadmium batteries, receiving considerable attention.

The lithium ion secondary battery includes a positive electrode and a negative electrode, and an electrolytic solution together with a separator. The negative electrode includes a negative electrode active material related to a charge/discharge reaction.

As the negative electrode active material, while a carbon-based active material is widely used, a further improvement in a battery capacity is demanded from recent market demand. In order to improve the battery capacity, it has been studied to use silicon as the negative electrode active material. This is because the silicon has a theoretical capacity (4199 mAh/g) of more than 10 times larger than a theoretical capacity of graphite (372 mAh/g), and a great improvement in the battery capacity is expected. A development of a silicon material as the negative electrode active material includes studies on not only a silicon simple substance but also on compounds represented by alloys, oxides or the like. Furthermore, shapes of the active material have been studied, regarding the carbon-based active material, from a standard coating type to an integrated type directly deposited on a current collector.

However, when the silicon is used as a main raw material as the negative electrode active material, since the negative electrode active material expands and contracts during charge/discharge, mainly the neighborhood of a superficial layer of the negative electrode active material becomes easily broken. Furthermore, an ionic substance is generated inside the active material, and the negative electrode active material becomes easily broken. When the superficial layer of the negative electrode active material is broken, a new surface is generated thereby, and a reaction area of the active material increases. At this time, since a decomposition reaction of an electrolytic solution occurs on the new surface and a film that is a decomposition product of the electrolytic solution is formed on the new surface, therefore the electrolytic solution is consumed. Therefore, the cycle characteristics become easily degraded.

Until now, in order to improve an initial efficiency and the cycle characteristics of a battery, negative electrode materials for lithium ion secondary batteries having the silicon material as a main material and electrode configurations have been variously studied.

Specifically, in order to obtain excellent cycle characteristics and high safety, silicon and amorphous silicon dioxide are simultaneously deposited by using a gas phase method (see, for example, Patent Literature 1 below). Furthermore, in order to obtain high battery capacity and safety, a carbon material (an electron conducting material) is provided on a superficial layer of particles of silicon oxide (see, for example, Patent Literature 2 below). Furthermore, in order to improve the cycle characteristics and to obtain high input/output characteristics, an active material containing silicon and oxygen is prepared and an active material layer having a high oxygen ratio in the neighborhood of a current collector is formed (see, for example, Patent Literature 3 below). Still furthermore, in order to improve the cycle characteristics, oxygen is contained in a silicon active material such that an average oxygen content is 40 atomic percent or less, and an oxygen content is high in a place close to a current collector (see, for example, Patent Literature 4 below).

Furthermore, in order to improve a first time charge/discharge efficiency, a nano composite containing a Si phase, $SiO_2$ and $M_yO$ metal oxide is used (see, for example, Patent Literature 5, below). Still furthermore, in order to improve the cycle characteristics, $SiO_x$ ($0.85 \leq x \leq 1.5$, a particle size range=1 μm to 50 μm) and a carbon material are mixed and sintered at a high temperature (see, for example, Patent Literature 6, below). Furthermore, in order to improve the cycle characteristics, an active material is controlled in the range such that a molar ratio of oxygen to silicon in a negative electrode active material is from 0.1 to 1.2, and, a difference of the maximum value and the minimum value of the molar ratio in the neighborhood of an interface of the active material and a current collector is 0.4 or less (see, for example, Patent Literature 7, below). Still furthermore, in order to improve battery load characteristics, a metal oxide containing lithium is used (see, for example, Patent Literature 8, below). Furthermore, in order to improve the cycle characteristics, a hydrophobic layer such as a silane compound is formed on a superficial layer of a silicon material (see, for example, Patent Literature 9, below). Still furthermore, in order to improve the cycle characteristics, silicon oxide is used, and a graphite film is formed on a superficial layer thereof to impart electric conductivity (see, for example, Patent Literature 10, below). In the Patent Literature 10, regarding a shift value obtained from a Raman spectrum of the graphite film, broad peaks appear at 1330 $cm^{-1}$ and 1580 $cm^{-1}$, and an intensity ratio thereof $I_{1330}/I_{1580}$ is $1.5<I_{1330}/I_{1580}<3$. Furthermore, in order to obtain high battery capacity and improve cycle characteristics, particles having a silicon crystallite phase dispersed in silicon dioxide are used (see, for example, Patent Literature 11, below). Still furthermore, in order to improve overcharge and overdischarge characteristics, silicon oxide in which an atomic ratio of silicon and oxygen is controlled to 1:y ($0<y<2$) is used (see, for example, Patent Literature 12, below).

CITATION LIST

Patent Literature

Patent Literature 1: JP 2001-185127 A
Patent Literature 2: JP 2002-042806 A
Patent Literature 3: JP 2006-164954 A
Patent Literature 4: JP 2006-114454 A
Patent Literature 5: JP 2009-070825 A
Patent Literature 6: JP 2008-282819 A
Patent Literature 7: JP 2008-251369 A
Patent Literature 8: JP 2008-177346 A
Patent Literature 9: JP 2007-234255 A
Patent Literature 10: JP 2009-212074 A
Patent Literature 11: JP 2009-205950 A
Patent Literature 12: JP 2997741 B1

SUMMARY OF INVENTION

Technical Problem

As was described above, in recent years, higher performance and multi-functionalization of small-sized mobile devices typical in the electronic devices have been forwarded, and a lithium ion secondary battery that is a main power source thereof is required to have an increased battery capacity. As one measure to solve the problem, it is desired to develop a lithium ion secondary battery formed of a negative electrode that uses a silicon material as a main material. Furthermore, the lithium ion secondary battery that uses the silicon material is desired to have the first time efficiency and cycle characteristics close to equivalent with those of a lithium ion secondary battery that uses a carbon-based active material. However, a negative electrode active material that shows the same first time efficiency and cycle stability as those in the lithium ion secondary battery that uses a carbon-based active material has not been proposed.

The present disclosure was performed in view of the above problems, and it is intended to provide a negative electrode active material, a mixed negative electrode active material containing the negative electrode active material, a negative electrode having a negative electrode active material layer formed with the negative electrode active material, and a lithium ion secondary battery that uses the negative electrode active material of the present disclosure, which are capable of improving initial charge/discharge characteristics and cycle characteristics when used as the negative electrode active material of a lithium ion secondary battery. Furthermore, it is also intended to provide a method of producing the negative electrode active material of the present disclosure capable of improving the initial charge/discharge characteristics and cycle characteristics.

Solution to Problem

In order to achieve the above object, the present disclosure is a negative electrode active material containing particles of negative electrode active material, the particles of negative electrode active material containing particles of silicon compound containing a silicon compound ($SiO_x$: $0.5 \leq x \leq 1.6$), the particles of silicon compound containing at least one kind or more of $Li_2SiO_3$ and $Li_4SiO_4$, the particles of silicon compound containing nickel, a mass of the nickel to a mass of the particles of negative electrode active material being 2 mass ppm or more and 100 mass ppm or less.

Since the negative electrode active material of the present disclosure contains the particles of negative electrode active material (also called as particles of silicon-based active material) containing the particles of silicon compound, the battery capacity may be improved. Furthermore, since a $SiO_2$ component part that becomes unstable during insertion and detachment of lithium during the charge/discharge of the battery in the silicon compound is modified in advance to lithium silicate, the irreversible capacity generated during the charge may be reduced. Furthermore, when the particles of silicon compound contain the nickel at a ratio like this, the electronic conductivity of the negative electrode active material may be improved. By imparting the electronic conductivity like this, the initial efficiency and cycle characteristics of the negative electrode active material may be improved.

At this time, it is preferable that the particles of silicon compound further contain chromium and a sum total of a mass of the nickel and a mass of the chromium to a mass of the particles of negative electrode active material is 2 mass ppm or more and 100 mass ppm or less.

When the particles of silicon compound contain the nickel and chromium at the ratio like this, the electronic conductivity of the negative electrode active material may be further improved. Therefore, the initial efficiency and cycle characteristics of the negative electrode active material may be more effectively improved.

Furthermore, it is preferable that the particles of silicon compound further contain aluminum, and a mass of the aluminum relative to the mass of the particles of negative electrode active material is 5 mass ppm or more and 500 mass ppm or less.

When the particles of silicon compound further contain the aluminum at the ratio like this, the electronic conductivity of the negative electrode active material may be further improved. Thus, the cycle characteristics of the negative electrode active material may be more effectively improved.

At this time, it is preferable that at least a part of the particles of silicon compound contain an aluminum-lithium alloy.

Due to the presence of the aluminum-lithium alloy like this, during production of the negative electrode, lithium may be suppressed from eluting into a slurry in which the particles of negative electrode active material are mixed and the slurry may be stabilized.

Furthermore, it is preferable that the particles of silicon compound further contain zirconium, and a mass of the zirconium relative to the mass of the particles of negative electrode active material is 0.5 mass ppm or more and 500 mass ppm or less. Still furthermore, the mass of the zirconium relative to the mass of the particles of negative electrode active material is preferably 10 mass ppm or more and 100 mass ppm or less.

When the particles of negative electrode active material further contain the zirconium at the ratio like this, stress due to expansion and contraction of the particles of silicon compound during charge/discharge of the battery may be alleviated. Thus, the cycle characteristics of the negative electrode active material may be more effectively improved.

Furthermore, it is preferable that the particles of silicon compound have a half value width (2θ) of a diffraction peak derived from a Si(111) crystal plane obtained by X-ray diffractometry of 1.2° or more and a crystallite size corresponding to the crystal plane of 7.5 nm or less.

When the negative electrode active material in which the particles of silicon compound have the silicon crystallinity is used as the negative electrode active material of the lithium ion secondary battery, more excellent cycle characteristics and initial charge/discharge efficiency may be obtained.

Furthermore, it is preferable that the negative electrode active material of the present disclosure satisfy a relationship of A>B between a maximum peak intensity value A of Si and Li silicate regions provided in −60 to −95 ppm as a chemical shift value obtained from a $^{29}$Si-MAS-NMR spectrum and a peak intensity value B of a $SiO_2$ region provided in −96 to −150 ppm as the chemical shift value in the particles of silicon compound.

In the particles of silicon compound, when an amount of Si and $Li_2SiO_3$ is more abundant relative to the $SiO_2$ component, the negative electrode active material by which an improvement effect of the battery characteristics due to the insertion of Li is sufficiently obtained may be obtained.

Furthermore, when a test cell formed of a negative electrode containing a mixture of the negative electrode active material and a carbon-based active material and a counter electrode lithium is prepared, in the test cell, charge/discharge including charge during which a current is flowed so as to insert lithium into the negative electrode active material and discharge during which the current is flowed so as to detach the lithium from the negative electrode active material is carried out 30 times, and a graph showing a relationship between a differential value dQ/dV obtained by differentiating a discharge capacity Q in each charge/discharge by a potential V of the negative electrode based on the counter electrode lithium and the potential V is depicted, it is preferable that the potential V of the negative electrode during discharges on or after X times (1≤X≤30) has a peak in the range of from 0.40 V to 0.55 V.

Since the above peak in the V-dQ/dV curve is similar to the peak of the silicon material and has a sharp rise of a discharge curve on a higher potential side, when a battery is designed, a capacity is easily developed. Furthermore, when the peak is developed during the charge/discharge within 30 times, the negative electrode active material in which a stable bulk is formed is obtained.

Furthermore, a median diameter of the particles of negative electrode active material is preferably 1.0 µm or more and 15 µm or less.

When the median diameter is 1.0 µm or more, an increase of the battery irreversible capacity may be suppressed from increasing due to an increase in a surface area a mass. On the other hand, by setting the median diameter to 15 µm or less, the particles become difficult to be cracked and a new surface is difficult to be developed.

Furthermore, the particles of negative electrode active material preferably contain a carbon material on a superficial part.

Thus, when the particles of negative electrode active material contain the carbon material on the superficial part thereof, the electric conductivity may be improved.

Furthermore, an average thickness of the carbon material is preferably 10 nm or more and 5000 nm or less.

When the average thickness of the carbon material is 10 nm or more, the electric conductivity may be improved. Furthermore, when the average thickness of the carbon material to be coated is 5000 nm or less, by using the negative electrode active material containing the particles of negative electrode active material like this in a lithium ion secondary battery, the battery capacitance may be suppressed from degrading because the particles of silicon compound may be sufficiently secured.

The mixed negative electrode active material characterized by containing the negative electrode active material and the carbon-based active material is provided.

Thus, when the carbon-based active material is contained together with the negative electrode active material (silicon-based negative electrode active material) of the present disclosure as a material for forming a negative electrode active material layer, the electric conductivity of the negative electrode active material layer may be improved and an expansion stress accompanying the charge may be alleviated. Furthermore, by mixing the silicon-based negative electrode active material with the carbon-based active material, the battery capacity may be improved.

Furthermore, in order to achieve the object, the present disclosure provides a negative electrode for nonaqueous electrolyte secondary batteries characterized by containing the mixed negative electrode active material and by having a ratio of a mass of the negative electrode active material relative to a sum total of masses of the negative electrode active material and the carbon-based active material of 6% by mass or more.

When the rate of the mass of the negative electrode active material (silicon-based negative electrode active material) relative to a sum total of masses of the negative electrode active material (silicon-based negative electrode active material) and the carbon-based active material is 6% by mass or more, the battery capacity may be further improved.

Furthermore, in order to achieve the object, the present disclosure provides a negative electrode for nonaqueous electrolyte secondary batteries, characterized by having a negative electrode active material layer formed with the mixed negative electrode active material and a negative electrode current collector, by having the negative electrode active material layer formed on the negative electrode current collector, by containing carbon and sulfur in the negative electrode current collector, and by having a content of each thereof of 100 mass ppm or less.

Thus, when the negative electrode current collector constituting the negative electrode contains the carbon and sulfur in the amount described above, the negative electrode may be suppressed from deforming during the charge.

Furthermore, in order to achieve the object, the present disclosure provides a lithium ion secondary battery characterized by using a negative electrode containing the negative electrode active material.

When the lithium ion secondary battery uses the negative electrode containing the negative electrode active material like this, high capacity, excellent cycle characteristics and initial charge/discharge characteristics are obtained.

Furthermore, in order to achieve the object, the present disclosure is a method of producing a negative electrode active material containing particles of negative electrode active material containing particles of silicon compound, the method including: preparing particles of negative electrode active material containing particles of silicon compound containing a silicon compound ($SiO_x$:0.5≤x≤1.6) and nickel; making at least one kind or more of $Li_2SiO_3$ and $Li_4SiO_4$ contain by inserting Li in the particles of negative electrode active material; and selecting, from the particles of negative electrode active material, particles of negative electrode active material that contain the nickel of a mass of 2 mass ppm or more and 100 mass ppm or less relative to a mass of the particles of negative electrode active material, wherein by using the selected particles of negative electrode active material, a negative electrode active material is produced.

When the negative electrode active material is produced by selecting thus the particles of silicon-based active material, the negative electrode active material having high capacity, excellent cycle characteristics and initial charge/discharge characteristics when used as the negative electrode active material of the lithium ion secondary battery may be produced.

Furthermore, in order to achieve the object, the present disclosure provides a production method of a lithium ion secondary battery characterized by preparing a negative electrode using the negative electrode active material produced according to the production method of the negative electrode active material, and by producing a lithium ion secondary battery with the prepared negative electrode.

By using the negative electrode active material produced as described above, a lithium ion secondary battery having high capacity, excellent cycle characteristics and initial charge/discharge characteristics may be produced.

Advantageous Effects of Invention

The negative electrode active material of the present disclosure may obtain high capacity and excellent cycle characteristics and initial charge/discharge characteristics when used as the negative electrode active material of secondary batteries. Furthermore, similar effect may be obtained also in the mixed negative electrode active material, the negative electrode, and the lithium ion secondary battery, which contain the negative electrode active material. Furthermore, according to the production method of the negative electrode active material of the present disclosure, the negative electrode active material having excellent cycle characteristics and initial charge/discharge characteristics may be produced when used as the negative electrode active material of the secondary battery.

BRIEF DESCRIPTION OF THE DRAWINGS

FIG. 1 is a cross-sectional diagram showing a configuration of a negative electrode for nonaqueous electrolyte secondary batteries of the present disclosure;

FIG. 2 is one example of a $^{29}$Si-MAS-NMR spectrum measured from particles of silicon compound when modified by a redox method;

FIG. 3 is one example of a $^{29}$Si-MAS-NMR spectrum measured from the particles of silicon compound when modified by a thermal doping method;

FIG. 4 is a diagram showing a configurational example (laminate film type) of a lithium ion secondary battery of the present disclosure; and FIG. 5 is a graph expressing a relationship between a rate of the particles of silicon compound relative to a sum total of a negative electrode active material and an increase rate of battery capacity of the secondary battery.

DESCRIPTION OF EMBODIMENTS

In what follows, an embodiment of the present disclosure will be described. However, the present disclosure is not limited thereto.

As was described above, as one of methods for making the battery capacity of the lithium ion secondary battery increase, it has been studied to use a negative electrode that uses a silicon material as a main material as a negative electrode of a lithium ion secondary battery. The lithium ion secondary battery that uses the silicon material is desired to have the initial charge/discharge characteristics and cycle characteristics close to the same as the lithium ion secondary battery that uses the carbon-based active material. However, a negative electrode active material having the same initial efficiency and cycle characteristics as in the lithium ion secondary battery that uses the carbon-based active material has not been proposed.

There, the present inventors have conducted intensive study to solve such problems. As a result thereof, it was found that when the particles of negative electrode active material contain particles of silicon compound containing a silicon compound ($SiO_x$: $0.5 \le x \le 1.6$), the particles of silicon compound contain at least one kind or more of $Li_2SiO_3$ and $Li_4SiO_4$, the particles of silicon compound contain nickel, and a relationship that a mass of the nickel to a mass of the particles of negative electrode active material is 2 mass ppm or more and 100 mass ppm or less is satisfied, when used in a secondary battery, excellent cycle characteristics and initial charge/discharge efficiency may be obtained, and came to the completion of present disclosure.

(Negative Electrode for Nonaqueous Electrolyte Secondary Battery)

First, a negative electrode for nonaqueous electrolyte secondary batteries will be described. FIG. 1 shows a cross-sectional configuration of a negative electrode for nonaqueous secondary batteries (hereinafter, also referred to as "negative electrode") in one embodiment of the present disclosure.

(Configuration of Negative Electrode)

As shown in FIG. 1, a negative electrode 10 is configured to have a negative electrode active material layer 12 on a negative electrode current collector 11. The negative electrode active material layer 12 may be formed on both surfaces or on only one surface of the negative electrode current collector 11. Furthermore, when the negative electrode active material of the present disclosure is used, the negative electrode current collector 11 may not be used.

(Negative Electrode Current Collector)

The negative electrode current collector 11 is configured of a substance that is an excellent electrically conductive material and has excellent mechanical strength. As the electrically conductive materials that may be used for the negative electrode current collector 11, for example, copper (Cu) or nickel (Ni) may be used. The electrically conductive material is preferable not to form an intermetallic compound with lithium (Li).

The negative electrode current collector 11 preferably contains carbon (C) or sulfur (S) other than a main element. This is because the physical strength of the negative electrode current collector may be improved. In particular, in the case where an active material layer that expands during charge is contained, when the current collector contains the elements, deformation of the electrode including the current collector may be suppressed. Although contents of the elements contained are not particularly limited, in particular, each is preferably 100 mass ppm or less. This is because higher deformation suppression effect is obtained. Due to the deformation suppression effect like this, the cycle characteristics may be further improved.

Furthermore, a surface of the negative electrode current collector 11 may be roughened or may not be roughened. The roughened negative electrode current collector is a metal foil treated by, for example, an electrolytic treatment, an embossing treatment, a chemical etching treatment or the like. The negative electrode current collector that is not roughened is, for example, a rolled metal foil or the like.

(Negative Electrode Active Material Layer)

The negative electrode active material layer 12 contains a negative electrode active material of the present disclosure capable of absorbing or releasing lithium ions, and, from the viewpoint of battery design, may further contain other materials such as a negative electrode binder, a conductive assistant or the like. The negative electrode active material contains particles of negative electrode active material, and the particles of negative electrode active material contain particles of silicon compound containing a silicon compound ($SiO_x$: $0.5 \leq x \leq 1.6$).

Furthermore, the negative electrode active material layer 12 may contain a mixed negative electrode active material that contains the negative electrode active material of the present disclosure and a carbon-based active material. Electric resistance of the negative electrode active material layer is lowered thereby, and the expansion stress accompanying the charge may be alleviated. Examples of the carbon-based active materials include pyrolytic carbons, cokes, glass-like carbon fibers, organic polymer compound sinters, carbon blacks and the like.

Furthermore, the negative electrode of the present disclosure preferably has a rate of a mass of the negative electrode active material (silicon-based negative electrode active material) to a sum total of masses of the negative electrode active material of the present disclosure (silicon-based negative electrode active material) and the carbon-based active material of 6% by mass or more. When the rate of mass of the negative electrode active material of the present disclosure to a sum total of masses of the negative electrode active material of the present disclosure and the carbon-based active material is 6% by mass or more, battery capacity may be surely improved.

Furthermore, the negative electrode active material of the present disclosure such as described above contains particles of silicon compound, the particles of silicon compound are a silicon oxide material containing a silicon compound ($SiO_x$: $0.55 \leq x \leq 1.6$), and the composition thereof preferably has x closer to 1. This is because high cycle characteristics may be obtained. By the way, the composition of the silicon compound in the present disclosure does not necessarily mean a purity of 100%, and may contain a slight amount of impurities.

Furthermore, in the negative electrode active material of the present disclosure, the particles of silicon compound preferably contain at least one kind or more of $Li_2SiO_3$ and $Li_4SiO_4$. These are obtained by modifying a $SiO_2$ component part which becomes unstable during insertion and detachment of lithium during charge/discharge of a battery in the silicon compound in advance to another lithium silicate, therefore irreversible capacity generated during charge may be reduced.

Furthermore, although the presence of at least one kind or more of $Li_4SiO_4$ and $Li_2SiO_3$ inside a bulk of the particles of silicon compound may improve the battery characteristics, when the two kinds of Li compounds are made coexist, the battery characteristics are further improved. By the way, these lithium silicates may be quantified by NMR (Nuclear Magnetic Resonance) or XPS (X-ray photoelectron spectroscopy). Measurements of XPS and NMR are performed under, for example, the following conditions.

XPS
 Device: X-ray photoelectron spectrometer,
 X-ray source: monochromatic Al—K alpha line,
 X-ray spot diameter: 100 μm, and
 Ar ion gun sputtering condition: 0.5 kV/2 mm×2 mm.
 $^{29}$Si MAS NMR (magic angle rotation nuclear magnetic resonance)
 Device: 700 NMR spectrometer produced by Bruker Inc.,
 Probe: 4 mm HR-MAS Rotor 50 μL,
 Sample revolving speed: 10 kHz, and
 Measurement environment temperature: 25°.

Furthermore, the particles of silicon compound contain nickel, and a mass of the nickel to a mass of the particles of negative electrode active material is 2 mass ppm or more and 100 mass ppm or less. When the particles of silicon compound contain the nickel at such a rate, the electronic conductivity of the negative electrode active material is improved. When the mass of nickel to the mass of the particles of negative electrode active material is less than 2 mass ppm, an improvement effect of the electronic conductivity may not be sufficiently obtained. When the mass of the nickel to the mass of the particles of negative electrode active material is more than 100 mass ppm, due to a structural change of the silicon compound, the diffusibility of lithium is degraded to result in inviting degradation of the cycle characteristics and capacity retention rate.

Furthermore, it is preferable that particles of silicon compound further contain chromium, and a sum total of a mass of nickel and a mass of chromium to a mass of particles of negative electrode active material is 2 mass ppm or more and 100 mass ppm or less. When the particles of silicon compound contain the nickel and chromium at such a rate, the electronic conductivity of the negative electrode active material is improved. When the sum total is 2 mass ppm or more, the electronic conductivity is effectively improved, and when the sum total is 100 mass ppm or less, the structural change of the silicon compound may be suppressed. As a result thereof, the negative electrode active material capable of further improving the initial charge/discharge characteristics and cycle characteristics may be obtained when used in the secondary battery.

Furthermore, it is preferable that the particles of silicon compound further contain aluminum, and a mass of the aluminum to a mass of particles of negative electrode active material is 5 mass ppm or more and 500 mass ppm or less. When the particles of silicon compound further contain the aluminum at such a rate, the electronic conductivity of the negative electrode active material is further improved. When the mass of the aluminum to the mass of the particles of negative electrode active material is 5 mass ppm or more, the electronic conductivity is effectively improved, and when the mass of the aluminum to the mass of the particles of negative electrode active material is 500 mass ppm or less, the structural change of the silicon compound may be suppressed. As a result thereof, when used in the secondary battery, the negative electrode active material that may further improve the cycle characteristics is obtained.

Furthermore, it is preferable that the negative electrode active material of the present disclosure contains an aluminum-lithium alloy in at least a part of the particles of silicon compound. Thus, lithium is suppressed from eluting into the slurry in which the particles of negative electrode active material are mixed during production of the negative electrode and the slurry may be stabilized.

Furthermore, it is preferable that the particles of silicon compound further contain zirconium, and a mass of the zirconium to the mass of the particles of negative electrode active material is 0.5 mass ppm or more and 500 mass ppm or less. It is particularly preferable that the mass of the zirconium to the mass of the particles of negative electrode active material is 10 mass ppm or more and 100 mass ppm or less. When the particles of silicon compound contain the zirconium at such a rate, the stress due to expansion and contraction of the particles of silicon compound may be alleviated during the charge/discharge of a battery. When the mass of the zirconium to the mass of the particles of negative electrode active material is 0.5 mass ppm or more, a stress alleviation effect may be sufficiently obtained. Furthermore, when the mass of the zirconium to the mass of the particles of negative electrode active material is 500 mass ppm or less, the structural change of the silicon compound may be suppressed. As a result thereof, when used in the secondary battery, the negative electrode active material that may further improve the cycle characteristics is obtained.

Furthermore, in order to make nickel, chromium, aluminum and zirconium contain in the particles of silicon-based substance, substances containing nickel, chromium, aluminum and zirconium may be added to a raw material when producing the silicon compound as will be described below. For example, when the particles of silicon compound are obtained by heating a raw material that generates silicon oxide gas, followed by depositing generated silicon oxide gas on an absorption plate, by using a raw material to which the metal components are added, nickel, chromium, aluminum and zirconium are vaporized together with the silicon oxide gas and mingled in the particles of silicon compound.

Amounts of metal elements of the metal elements contained in the particles of silicon compound may be measured by, for example, ICP-OES (Inductively Coupled Plasma Optical Emission Spectrometry) or the like.

Furthermore, it is preferable that the particles of silicon compound have a half-value width (2θ) of a diffraction peak due to a Si (111) crystal plane obtained by X-ray diffractometry of 1.2° or more and a crystallite size corresponding to the crystal plane of 7.5 nm or less. The lower the silicon crystallinity of the silicon compound in the particles of silicon compound is, the better, in particular, when an abundance of Si crystals is small, the battery characteristics may be improved, and, furthermore, a stable Li compound may be generated.

Furthermore, it is preferable that the particles of negative electrode active material of the present disclosure satisfy a relationship of A>B between a maximum peak intensity value A of Si and Li silicate regions provided in −60 to −95 ppm as a chemical shift value obtained from a $^{29}$Si-MAS-NMR spectrum and a peak intensity value B of a $SiO_2$ region provided in −96 to −150 ppm as the chemical shift value in the particles of silicon compound. In the particles of silicon compound, when an amount of a silicon component or $Li_2SiO_3$ is relatively abundant relative to a $SiO_2$ component, an improvement effect of the battery characteristics due to the insertion of Li is sufficiently obtained.

It is preferable that when a test cell formed of a negative electrode containing a mixture of the negative electrode active material and the carbon-based active material and a counter electrode lithium is prepared, in the test cell, charge/discharge formed of charge that flows a current such that lithium is inserted in the negative electrode active material and discharge that flows a current such that the lithium is detached from the negative electrode active material is repeated 30 times, and a graph showing a relationship between a differential value dQ/dV obtained by differentiating a discharge capacity Q in each charge/discharge by a potential V of the negative electrode based on the counter electrode lithium and the potential V is depicted, the potential V of the negative electrode has a peak in the range of 0.40 to 0.55 V during discharge of X times and after (1≤X≤30). The peak in a V-dQ/dV curve is similar to the peak of the silicon material, and since a discharge curve on a higher potential side rises up sharply, when designing a battery, capacity is readily developed. Furthermore, when the peak is developed within 30 times of the charge/discharge, it may be judged that a stable bulk is formed.

Furthermore, it is preferable that the negative electrode active material of the present disclosure has a median diameter ($D_{50}$: a particle size when a cumulative volume becomes 50%) of the particles of negative electrode active material in the range of 1.0 μm or more and 15 μm or less. This is because when the median diameter is within the above range, lithium ions are readily absorbed/released during charge/discharge and crack of the particles becomes difficult to occur. When the median diameter is 1.0 μm or more, a surface area a mass may be made smaller, and an increase in the battery irreversible capacity may be suppressed. On the other hand, when the median diameter is set to 15 m or less, a new surface is difficult to appear because the particles become difficult to be cracked.

Furthermore, in the negative electrode active material of the present disclosure, the particles of negative electrode active material preferably contain a carbon material in a superficial layer part. When the particles of negative electrode active material contain the carbon material in the superficial part thereof, the electric conductivity may be improved. Therefore, when the negative electrode active material containing the particles of negative electrode active material like this is used as the negative electrode active material of the secondary battery, the battery characteristics may be improved.

Furthermore, an average thickness of the carbon material of the superficial part of the particles of negative electrode active material is preferably 10 nm or more and 5000 nm or less. When the average thickness of the carbon material is 10 nm or more, the electric conductivity may be improved, and in the case where the average thickness of the carbon material to be coated is 5000 nm or less, when the negative electrode active material containing the particles of negative electrode active material like this is used as the negative electrode active material of a lithium ion secondary battery, the battery capacity may be suppressed from decreasing.

The average thickness of the coated carbon material part may be calculated according to, for example, the following procedure. First, the particles of negative electrode active material are observed at an arbitrary magnification by a TEM (transmission type electron microscope). The magnification that allows visual confirmation of a thickness of the carbon material so as to be able to measure the thickness is preferable. Subsequently, at optional 15 points, the thicknesses of the coated parts are measured. In this case, it is preferable to set measurement positions broadly and at random without concentrating on particular positions as much as possible. Last, an average value of the thicknesses of the coated parts of the 15 points is calculated.

Although a coverage of the carbon material is not particularly limited, the coverage is desirably as much as high. When the coverage is 30% or more, it is preferable because the electric conductivity is further improved. Although a covering method of the carbon material is not particularly limited, a sugar carbonization method and a pyrolysis method of hydrocarbon gas are preferred. It is because a coverage may be improved.

Furthermore, as a negative electrode binder contained in the negative electrode active material layer, at least any one kind or more of, for example, a polymer material, a synthetic rubber and so on may be used. Examples of the polymer materials include polyvinylidene fluoride, polyimide, polyamide-imide, aramid, polyacrylic acid, lithium polyacrylate, carboxymethylcellulose and the like. Examples of the synthetic rubbers include styrene-butadiene rubbers, fluororubbers, ethylene propylene diene and the like.

As the negative electrode conductive assistant, any one kind or more of carbon materials such as carbon black, acetylene black, graphite, Ketjen black, carbon nanotube, carbon nanofiber and the like may be used.

The negative electrode active material layer may be formed by, for example, a coating method. The coating method is a method in which after the particles of negative electrode active material, the binder and the like, further, as needs arise, the conductive assistant, and the carbon material are mixed, followed by dispersing in an organic solvent, water or the like, further followed by coating.

(Production Method of Negative Electrode)

A negative electrode may be formed according to, for example, the following procedure. First, a production method of a negative electrode active material used in the negative electrode will be described. In the beginning, particles of negative electrode active material containing particles of silicon compound containing a silicon compound ($SiO_x$: $0.55 \leq x \leq 1.6$) and nickel are prepared. Next, Li is inserted in the particles of negative electrode active material to make at least one kind or more of $Li_2SiO_3$ and $Li_4SiO_4$ contain. Next, particles in which a mass of nickel to a mass of the particles of negative electrode active material is 2 mass ppm or more and 100 mass ppm or less are selected from the particles of negative electrode active material. Then, a negative electrode active material is produced with the selected particles of negative electrode active material.

More specifically, the negative electrode active material may be produced as shown below. At the beginning, a raw material that generates silicon oxide gas is heated in the temperature range of from 900° C. to 1600° C. under presence of inert gas and under reduced pressure to generate silicon oxide gas. At this time, a mixture of metallic silicon powder, silicon dioxide powder and a substance containing nickel may be used as a raw material. Other than this, substances containing chromium, aluminum, and zirconium may be added to the raw material. When considering a surface oxygen of the metallic silicon powder and a slight amount of oxygen in a reaction furnace, a mixing molar ratio is desirably in the range of 0.8<metallic silicon powder/silicon dioxide powder<1.3.

Generated silicon oxide gas is solidified and deposited on the absorption plate. At this time, in the present disclosure, a temperature increase program such as a temperature increase rate and a temperature holding time may be adjusted such that a mass of nickel to a mass of the particles of negative electrode active material is 2 mass ppm or more and 100 mass ppm or less. Next, with an internal temperature of the reaction furnace lowered to 100° C. or less, the deposit of silicon oxide is taken out, followed by crushing, pulverizing with a ball mill, a jet mill or the like. As was described above, particles of silicon compound containing nickel may be produced. By the way, Si crystallites in the particles of silicon compound may be controlled by change of vaporization temperature, or heat treatment after generation.

Here, a layer of the carbon material may be formed on a superficial layer of the particles of silicon compound. As a method of forming the layer of carbon material, a thermal decomposition CVD method is desirable. A method of generating the layer of carbon material by the thermal decomposition CVD method will be described.

First, the particles of silicon compound are set in a furnace. Next, hydrocarbon gas is introduced into the furnace, and an internal temperature of the furnace is elevated. Although a decomposition temperature is not particularly limited, 1200° C. or less is desirable, and 950° C. or less is more desirable. When the decomposition temperature is set to 1200° C. or less, unintentional disproportionation of the particles of active material may be suppressed. After elevating the internal temperature of furnace to a predetermined temperature, a carbon layer is generated on a surface of the particles of silicon compound. Furthermore, the hydrocarbon gas that becomes a raw material of the carbon material is desirable, though not particularly limited, to be $n \leq 3$ in a $C_nH_m$ composition. In the case of $n \leq 3$, a production cost may be lowered, and, the physical properties of a decomposition product is made excellent.

Next, in the particles of negative electrode active material containing particles of silicon compound prepared as shown above, Li is inserted to make at least one kind of $Li_2SiO_3$ and $Li_4SiO_4$ contain. In the case where Al is contained in the particles of silicon compound, by insertion of Li, an aluminum-lithium alloy is also formed. The insertion of the Li is preferably performed by a redox method.

In a modification due to the redox method, for example, first, by soaking the particles of silicon oxide in a solution A in which lithium is dissolved in an ether solvent, the lithium may be inserted. In the solution A, a polycyclic aromatic compound or a straight chain polyphenylene compound may be further contained. After the insertion of Li, when the particles of silicon oxide are soaked in a solution B containing the polycyclic aromatic compound or a derivative thereof, active lithium may be detached from the particles of silicon compound. Examples of the solvents of the solution B include ether-based solvents, ketone-based solvents, ester-based solvents, alcohol-based solvents, amine-based solvents, or mixed solvents thereof. Furthermore, after soaking in the solution B, when the particles of silicon oxide are soaked in a solution C containing the alcohol-based solvent, a carboxylic acid-based solvent, water, or mixed solvent thereof, more abundant active lithium may be detached from the particles of silicon oxide. Furthermore, in place of the solution C, a solution C' that contains a compound having a quinoid structure in a molecule as a solute, and the ether-based solvent, the ketone-based solvent, the ester-based solvent, or mixed solvent thereof as the solvent may be used. Furthermore, soaking of the particles of silicon oxide in the solutions B, C and C' may be repeated. Thus, when the active lithium is detached after insertion of lithium, the negative electrode active material having higher water resistance is formed. After that, a method of cleaning with, for example, alcohol, alkali water in which lithium carbonate is dissolved, weak acid, or pure water or other methods may be applied.

Furthermore, the Li may be inserted in the particles of negative electrode active material by a thermal doping method. In this case, the modification may be performed by mixing, for example, the particles of negative electrode active material with a LiH powder or a Li powder, followed by heating under a non-oxidizing atmosphere. As the non-oxidizing atmosphere, for example, an Ar atmosphere or the like may be used. More specifically, first, the LiH powder or Li powder and silicon oxide powder are thoroughly mixed under an Ar atmosphere and sealed, a whole sealed container is stirred to homogenize. Thereafter, the modification is performed by heating in the range of from 700 to 750° C. Furthermore, in this case, in order to desorb Li from the silicon compound, a method in which the heated powder is sufficiently cooled, followed by cleaning with alcohol, alkali water, weak acid or pure water or other methods may be used.

By the way, when the modification is performed by the thermal doping method, a $^{29}$Si-MAS-NMR spectrum obtained from the particles of silicon compound is different from a case where the redox method is used. In FIG. 2, an example of the $^{29}$Si-MAS-NMR spectrum measured from the particles of silicon compound when modified by the redox method is shown. In FIG. 2, a peak given in the vicinity of −75 ppm is a peak derived from $Li_2SiO_3$, and a peak given in −80 to −100 ppm is a peak derived from Si. By the way, there is also a case where, in the range of from −80 to −100 ppm, a peak of a Li silicate other than $Li_2SiO_3$ and $Li_4SiO_4$ appears.

Furthermore, in FIG. 3, an example of the $^{29}$Si-MAS-NMR spectrum measured from the particles of silicon compound when the thermal doping method is applied to modify is shown. In FIG. 3, a peak given in the vicinity of −75 ppm is a peak derived from $Li_2SiO_3$, and a peak given in −80 to −100 ppm is a peak derived from Si. By the way, there is also a case where, in the range of from −80 to −100 ppm, a peak of a Li silicate other than $Li_2SiO_3$ and $Li_4SiO_4$ appears. By the way, a peak of $Li_4SiO_4$ may be confirmed from an XPS spectrum.

Next, particles in which the mass of nickel to the mass of the particles of negative electrode active material is 2 mass ppm or more and 100 mass ppm or less are selected from the modified particles of negative electrode active material. By the way, the selection of the particles of negative electrode active material is not necessarily performed every time when producing the negative electrode active material, that is, when the content of nickel is once measured, and production conditions where the mass of the nickel is 2 mass ppm or more and 100 mass ppm or less relative to the mass of the particles of negative electrode active material are found and selected, after that, the negative electrode active material may be produced under the same conditions as the selected conditions.

After mixing the negative electrode active material prepared as shown above with other materials such as a negative electrode binder, a conductive assistant and the like to form a negative electrode mixture, an organic solvent, water or the like is added to form a slurry. Next, on a surface of the negative electrode current collector, the slurry is coated, dried to generate a negative electrode active material layer. At this time, as needs arise, hot press or the like may be applied. Thus, the negative electrode may be prepared.

(Lithium Ion Secondary Battery)

Next, a lithium ion secondary battery of the present disclosure will be described. The lithium ion secondary battery of the present disclosure uses a negative electrode that contains the negative electrode active material of the present disclosure. Here, as a specific example, a laminate film type lithium ion secondary battery is cited as an example.

(Configuration of Laminate Film Type Lithium Ion Secondary Battery)

A laminate film type lithium ion secondary battery 20 shown in FIG. 4 houses a wound electrode body 21 mainly inside a sheet-like exterior member 25. The wound body has a separator between a positive electrode and a negative electrode and is formed by winding. Further, there is also a case where the positive electrode and the negative electrode have a separator therebetween and house a laminate body. In either of electrode bodies, a positive electrode lead 22 is attached to the positive electrode, and a negative electrode lead 23 is attached to the negative electrode. An outermost periphery part of the electrode body is protected by a protective tape.

The positive and negative electrode leads are led in one direction, for example, from the inside of the exterior member 25 toward an outside thereof. The positive electrode lead 22 is made of an electrically conductive material such as, for example, aluminum or the like, and the negative electrode lead 23 is made of an electrically conductive material such as, for example, nickel, copper or the like.

The exterior member 25 is a laminate film in which, for example, a fusion layer, a metal layer, and a surface protective layer are laminated in this order, and, in the laminate film, outer peripheral parts in the fusion layer of two sheets of film are fused with each other or are adhered with an adhesive or the like such that fusion layers may face with the electrode body 21. The fusion part is a film such as, for example, polyethylene, polypropylene or the like, and the metal part is an aluminum foil or the like. The protective layer is, for example, nylon or the like.

An adhesive film 24 is inserted between the exterior member 25 and the positive and negative electrode leads to prevent outer air from intruding. The material is, for example, a polyethylene, polypropylene, or polyolefin resin.

(Positive Electrode)

A positive electrode has a positive electrode active material layer on both sides or on one side of a positive electrode current collector in the same manner as the negative electrode 10 of, for example, FIG. 1.

The positive electrode current collector is made of an electrically conductive material such as aluminum or the like.

The positive electrode active material layer contains any one or more kinds of positive electrode materials capable of absorbing/releasing lithium ions, and, may contain other materials such as a binder, a conductive assistant, a dispersant and the like depending on a design. In this case, details of the binder and the conductive assistant are the same as, for example, the negative electrode binder and the negative electrode conductive assistant described above.

As the positive electrode material, a Li-containing compound is desirable. As the Li-containing compound, a composite oxide made of, for example, lithium and a transition metal element, or a phosphate compound having the Li and the transition metal element may be used. Among these positive electrode materials described, compounds containing at least one or more kinds of nickel, iron, manganese, and cobalt are preferred. Chemical formulas for these are expressed by, for example, $Li_xM1O_2$ or $Li_yM2PO_4$. In the formulas, M1 and M2 represent at least one or more kinds of the transition metal elements. Values of x and y show different values depending on a battery charge/discharge state, but, are generally shown by $0.55 \le x \le 1.10$ and $0.05 \le y \le 1.10$.

As the composite oxide containing the lithium and the transition metal element, for example, a lithium-cobalt composite oxide ($Li_xCoO_2$), a lithium-nickel composite oxide ($Li_xNiO_2$) or the like may be used. As the phosphate compound having the lithium and the transition metal element, for example, a lithium-iron phosphate compound ($LiFePO_4$), a lithium-iron-manganese phosphate compound ($LiFe_{1-u}Mn_uPO_4(0<u<1)$) or the like may be used. When these positive electrode materials are used, high battery capacity may be obtained and excellent cycle characteristics may be also obtained.

(Negative Electrode)

A negative electrode has the same configuration as the negative electrode 10 for lithium ion secondary batteries of the FIG. 1, and has a negative electrode active material layer 12, for example, on both sides of the current collector 11. It is preferable that the negative electrode charge capacity becomes larger than an electric capacity (charge capacity as a battery) obtained from the positive electrode active material agent. This is because the precipitation of the lithium metal on the negative electrode may be suppressed.

The positive electrode active material layer is provided on a part of both sides of the positive electrode current collector, and the negative electrode active material layer is also provided on a part of both sides of the negative electrode current collector. In this case, the negative electrode active material layer provided on, for example, the negative electrode current collector is provided on a region where an opposing positive electrode active material layer is not present. This is because stable battery design is carried out.

A non-facing region, that is, a region where the negative electrode active material layer and the positive electrode active material layer do not face is hardly influenced by the charge/discharge. Therefore, a state of the negative electrode active material layer is maintained just as immediately after the formation. Thereby, a composition of the negative electrode active material or the like may be accurately investigated with excellent reproducibility irrespective of the presence or non-presence of the charge/discharge.

(Separator)

A separator separates the positive electrode and the negative electrode and allows passage of lithium ions while preventing current short-circuit due to contact of both electrodes. The separator is formed of a porous film made of, for example, a synthetic resin, or ceramic, and may have a laminate structure in which two or more kinds of porous films are laminated. Examples of the synthetic resin include polytetrafluoroethylene, polypropylene, polyethylene and the like.

(Electrolytic Solution)

At least a part of the active material layer or the separator is impregnated with a liquid electrolyte (electrolytic solution). The electrolytic solution has an electrolyte salt dissolved in the solvent and may contain other materials such as an additive or the like.

As the solvent, for example, a nonaqueous solvent may be used. Examples of the nonaqueous solvents include ethylene carbonate, propylene carbonate, butylene carbonate, dimethyl carbonate, diethyl carbonate, ethyl methyl carbonate, methyl propyl carbonate, 1,2-dimethoxy ethane, tetrahydrofuran and the like. Among these, it is desirable to use at least one or more kinds of ethylene carbonate, propylene carbonate, dimethyl carbonate, diethyl carbonate, and ethyl methyl carbonate. This is because more excellent characteristics may be obtained. Furthermore, in this case, more advantageous characteristics may be obtained by combining a high viscosity solvent such as ethylene carbonate, propylene carbonate or the like and a low viscosity solvent such as dimethyl carbonate, ethyl methyl carbonate, diethyl carbonate or the like. This is because dissociability or ionic mobility of the electrolyte salt is improved.

When an alloy-based negative electrode is used, it is desirable to contain, in particular as a solvent, at least one kind of a halogenated linear carbonate ester or a halogenated cyclic carbonate ester. Thus, during charge/discharge, in particular during charge, a stable film is formed on a surface of the negative electrode active material. Here, the halogenated linear carbonate ester is a linear carbonate ester having a halogen as a constituent element (at least one hydrogen is substituted with a halogen). Furthermore, the halogenated cyclic carbonate ester is a cyclic carbonic acid ester having a halogen as a constituent element (that is, at least one hydrogen is substituted with a halogen).

Although a kind of the halogen is not particularly limited, fluorine is preferable. This is because a higher-quality film than other halogens may be formed. Furthermore, the larger the number of halogens is, the more desirable. This is because an obtained film is more stable, and a decomposition reaction of the electrolytic solution is reduced.

Examples of halogenated linear carbonic esters include carbonic acid fluoromethylmethyl ester, carbonic acid difluoromethylmethyl ester and the like. Examples of the halogenated cyclic carbonate esters include 4-fluoro-1,3-dioxolane-2-one, 4,5-difluoro-1,3-dioxolane-2-one and the like.

It is preferable to contain an unsaturated carbon bond cyclic carbonic ester as a solvent additive. This is because a stable film is formed on a surface of the negative electrode during charge/discharge to be able to suppress a decomposition reaction of the electrolytic solution. Examples of the unsaturated carbon bond cyclic carbonic ester include, for example, vinylene carbonate, vinyl ethylene carbonate and the like.

Furthermore, it is preferable to contain a sultone (cyclic sulfonic acid ester) as the solvent additive. This is because the chemical stability of the battery is improved. Examples of the sultone include, for example, propane sultone and propene sultone.

Furthermore, the solvent preferably contains an acid anhydride. This is because the chemical stability of the electrolytic solution is improved. As the acid anhydride, for example, propane disulfonic acid anhydride may be used.

The electrolyte salt may contain any one or more kinds of light metal salts such as lithium salts or the like. As the lithium salt, for example, lithium hexafluorophosphate (LiPFE), lithium tetrafluoroborate ($LiBF_4$) or the like may be used.

A content of the electrolyte salt is preferably 0.5 mol/kg or more and 2.5 mol/kg or less relative to the solvent. This is because high ionic conductivity is obtained.

(Production Method of Laminate Film Type Secondary Battery)

In the present disclosure, a negative electrode is prepared with the negative electrode active material produced according to a production method of the negative electrode active material of the present disclosure, and with the prepared negative electrode, a lithium ion secondary battery is produced.

At the beginning, a positive electrode is prepared with the above positive electrode material. First, a positive electrode mixture is formed by mixing the positive electrode active material and, as needs arise, a binder, a conductive assistant and the like, followed by dispersing in an organic solvent to form a positive electrode mixture slurry. Subsequently, the mixture slurry is coated on the positive electrode current collector by a coating device such as a knife roll, a die coater with a die head or the like and dried with hot air to obtain a positive electrode active material layer. At the end, the positive electrode active material layer is compression molded by a roll press machine or the like. At this time, heating may be applied, or, heating or compression may be repeated a plurality of times.

Next, by using the same operation procedure as in the preparation of a negative electrode for lithium ion secondary batteries 10, the negative electrode active material layer is formed on the negative electrode current collector to form a negative electrode.

When preparing the positive electrode and the negative electrode, the respective active material layer is formed on both sides of the positive electrode and negative electrode current collectors. At this time, in any of the electrodes, active material coating lengths of the both side parts may be displaced (see FIG. 1).

Subsequently, an electrolytic solution is prepared. Further subsequently, by using ultrasonic welding or the like, the positive electrode lead 22 is attached to the positive electrode current collector and the negative electrode lead 23 is attached to the negative electrode current collector. Then, the positive electrode and the negative electrode are laminated via the separator, or are wound to prepare a wound electrode body 21, followed by adhering a protective tape to an outermost peripheral part thereof. Next, the wound electrode body is molded into a flat shape. Then, after inserting the wound electrode body between folded film-like exterior member 25, insulation parts of the exterior member are adhered by a thermal fusion method with each other, and with only one direction opened, the wound electrode body is encapsulated. Then, an adhesive film is inserted between the positive electrode lead, and the negative electrode lead and the exterior member. A predetermined amount of the above prepared electrolytic solution is charged from a releasing part, followed by vacuum impregnation. After the impregnation, the releasing part is adhered by a vacuum thermal fusion method. As was described above, the laminate film type lithium ion secondary battery 20 may be produced.

EXAMPLE

In what follows, the present disclosure will be more specifically described with reference to Examples and Comparative Examples of the present disclosure. However, the present disclosure is not limited to these Examples.

Example 1-1

According to the following procedure, a laminate film type lithium ion secondary battery 20 shown in FIG. 4 was prepared.

First, a positive electrode was prepared. A positive electrode mixture was prepared by mixing 95% by mass of $LiNi_{0.7}Co_{0.25}Al_{0.05}O$ that is lithium-nickel-cobalt composite oxide (NCA) as a positive electrode active material, 2.5% by mass of a positive electrode conductive assistant, and 2.5% by mass of a positive electrode binder (polyvinylidene fluoride: PVDF). Subsequently, the positive electrode mixture was dispersed in an organic solvent (N-methyl-2-pyllolydone: NMP) to form a paste-like slurry. Subsequently, the slurry was coated on both sides of the positive electrode current collector with a coating machine having a die head, followed by drying with a hot air type dryer. At this time, the positive electrode current collector having a thickness of 15 μm was used. At the end, a roll press was used to perform compression molding.

Next, a negative electrode was prepared. First, a negative electrode active material was prepared in the following manner. A raw material obtained by adding nickel, chromium, aluminum, and zirconium in a mixture of metallic silicon and silicon dioxide was introduced into a reaction furnace, what was vaporized in an atmosphere having a degree of vacuum of 10 Pa was deposited on an absorption plate, after sufficiently cooling, a deposit was taken out and pulverized by a ball mill. A value of x of $SiO_x$ of particles of silicon compound obtained like this was 0.5. Subsequently, a particle size of the particles of silicon compound was adjusted by classification. Thereafter, a carbon film was coated on a surface of the particles of silicon compound by performing thermal CVD, and this was taken as particles of negative electrode active material.

Subsequently, lithium was inserted into the particles of negative electrode active material by a redox method to modify. First, the particles of negative electrode active material were soaked in a solution (solution $A_1$) in which a lithium piece and biphenyl that is a straight chain polyphenylene compound were dissolved in tetrahydrofuran (hereinafter, referred to also as THF). The solution $A_1$ of Example 1-1 was prepared by dissolving biphenyl in the THF solvent at the concentration of 1 mol/L, followed by adding the piece of lithium of a mass portion of 10% by mass relative to a mixed liquid of the THF and biphenyl. Furthermore, a temperature of the solution when soaking the particles of negative electrode active material was set to 20° C., and a soaking time was set to 10 hours. After that, the particles of negative electrode active material were filtered. According to the above treatment, the lithium was inserted into the particles of negative electrode active material.

Next, the particles of negative electrode active material after lithium insertion were soaked in a solution (solution B) in which naphthalene was dissolved in THF. The solution B of Example 1-1 was prepared by dissolving naphthalene in the THF solvent at the concentration of 2 mol/L. Furthermore, a temperature of the solution when the particles of negative electrode active material are soaked was set to 20° C., and the soaking time was set to 20 hours. After that, the particles of negative electrode active material were filtered.

Then, the particles of negative electrode active material after contact with the solution B were soaked in a solution (solution C) in which p-benzoquinone was dissolved in THF at the concentration of 1 mol/L. The soaking time was set to 2 hours. After that, the particles of negative electrode active material were filtered.

Next, the particles of negative electrode active material were cleansed, and the cleansed particles of negative electrode active material were dried under reduced pressure.

A negative electrode active material was prepared by blending the particles of negative electrode active material prepared as shown above and a carbon-based active material at a mass ratio of 1:9. Here, as the carbon-based active material, natural graphite coated with a pitch layer and artificial graphite were mixed at a mass ratio of 5:5 and used. Furthermore, a median diameter of the carbon-based active material was 20 μm.

Next, the prepared negative electrode active material, a conductive assistant 1 (carbon nanotubes, CNT), a conductive assistant 2 (carbon fine particles having a median diameter of about 50 nm), a styrene-butadiene rubber (styrene-butadiene copolymer, hereinafter, referred to as SBR), and carboxymethylcellulose (hereinafter, referred to as CMC) were mixed at a dry mass ratio of 92.5:1:1:2.5:3, followed by diluting with pure water to prepare a negative electrode mixture slurry. By the way, the SBR and CMC are negative electrode binders (negative electrode binding agent).

Furthermore, as the negative electrode current collector, an electrolytic copper foil having a thickness of 15 μm was used. The electrolytic copper foil contained carbon and sulfur each at a concentration of 70 mass ppm. At the end, the negative electrode mixture slurry was coated on the negative electrode current collector, followed by drying at 100° C.×1 hour in a vacuum atmosphere. After drying, a deposit amount of the negative electrode active material layer a unit area in one surface of the negative electrode (called also as area density) was 5 mg/cm².

Next, after solvents (4-fluoro-, 3-dioxolan-2-one (FEC), ethylene carbonate (EC) and dimethyl carbonate (DMC)) were mixed, an electrolyte salt (lithium hexafluorophosphate: $LiPF_6$) was dissolved to prepare an electrolytic solution. In this case, a composition of the solvent was set to FEC:EC:DMC=10:20:70 by volume ratio, and a content of the electrolytic salt was set to 1.2 mol/kg relative to the solvent.

Next, a secondary battery was assembled as shown below. At the beginning, an aluminum lead was ultrasonically welded to one end of the positive electrode current collector, and a nickel lead was welded to one end of the negative electrode current collector. Subsequently, the positive electrode, the separator, the negative electrode, and the separator were laminated in this order, and wound in the longitudinal direction to obtain a wound electrode body. A winding end part thereof was fixed with a PET protective tape. As the separator, a laminate film (thickness: 12 μm) in which a film having a porous polyethylene as a main component is sandwiched by a film having a porous polypropylene as a main component was used. Subsequently, after sandwiching the electrode body between the exterior members, outer periphery parts excluding one side were sealed each other by thermal fusion, and the electrode body was housed inside thereof. As the exterior member, an aluminum laminated film in which a nylon film, an aluminum foil, and a polypropylene film are laminated was used. Subsequently, after the prepared electrolytic solution was charged from the releasing part and impregnated under a vacuum atmosphere, thermal fusion was applied to seal.

The cycle characteristics and first time charge/discharge characteristics of the secondary battery prepared as shown above were evaluated.

The cycle characteristics were investigated as shown below. At the beginning, two cycles of charge/discharge were carried out at 0.2 C under the atmosphere of 25° C. for stabilizing the battery, and a discharge capacity at the second cycle was measured. Subsequently, the charge/discharge was performed until a total number of cycles becomes 499 cycles, and the discharge capacity was measured at each cycle. At the end, a capacity retention rate (hereinafter, simply referred to also as retention rate) was calculated by dividing the discharge capacity at the $500^{th}$ cycles obtained under 0.2 C charge/discharge by the discharge capacity at the $2^{nd}$ cycle. For normal cycles, that is, from $3^{rd}$ cycle to $499^{th}$ cycle, the charge/discharge was carried out at 0.7 C charge and 0.5 C discharge.

When investigating the first time charge/discharge characteristics, a first time efficiency (hereinafter, in some cases, referred to as initial efficiency) was calculated. The first time efficiency was calculated from a formula expressed by first time efficiency (%)=(first time discharge capacity/first time charge capacity)×100. An atmosphere temperature was set to the same as in the case where the cycle characteristics were investigated.

Example 1-2 to Example 1-3, Comparative Examples 1-1 and 1-2

Secondary batteries was produced in the same manner as in Example 1-1 except that an amount of oxygen in a bulk of the silicon compound was adjusted. In this case, the amount of oxygen was adjusted by changing a ratio of metallic silicon and silicon oxide in a raw material of a silicon compound or a heating temperature. Values of x of the silicon compound expressed by $SiO_x$ in Examples 1-1 to 1-3 and Comparative Examples 1-1 and 1-2 are shown in Table 1.

At this time, particles of silicon-based active materials of Examples 1-1 to 1-3 and Comparative Examples 1-1 and 1-2 had properties as shown below. $Li_2SiO_3$ and $Li_4SiO_4$ were contained in the inside of the particles of silicon compound in the particles of negative electrode active material. Furthermore, the particles of silicon compound contained an aluminum-lithium alloy. Furthermore, a median diameter $D_{50}$ of the particles of negative electrode active material was 4.0 μm. Furthermore, the silicon compound had the half value width (2θ) of a diffraction peak derived from a Si(111) crystal plane obtained by X-ray diffractometry of 2.257°, and crystallite size derived from the Si (111) crystal plane of 3.77 nm.

Furthermore, in all of Examples and Comparative Examples, peaks of Si and lithium silicate region given by −60 to −95 ppm as the chemical shift value obtained from a $^{29}$Si-MAS-NMR spectrum appeared. Furthermore, in all of the Examples and Comparative Examples, a relationship of a maximum peak intensity value A of Si and Li silicate regions provided in −60 to −95 ppm as a chemical shift value obtained from a $^{29}$Si-MAS-NMR spectrum and a peak intensity value B of a $SiO_2$ region provided in −96 to −150 ppm was A>B.

Furthermore, an average thickness of the carbon material contained in the particles of negative electrode active material was 100 nm.

Furthermore, by sampling 1 g of the particles of negative electrode active material, with an ICP-OES (Agilent 730), concentrations of nickel, chromium, aluminum, and zirconium contained in the particles of negative electrode active material were quantified. At this time, as a pretreatment, a mixed aqueous solution of hydrofluoric acid/nitric acid (hydrofluoric acid:nitric acid=1:1) was added to 1 g of the particles of negative electrode active material, after dissolution and drying under heating, an aqueous solution of nitric acid was added to adjust the treatment solution, thus a measurement sample was prepared.

As a result thereof, the mass of nickel to the mass of the particles of negative electrode active material was 25 ppm, and the mass of chromium to the mass of the particles of negative electrode active material was 25 ppm. Accordingly, a sum total of the mass of nickel and the mass of chromium to the mass of the particles of negative electrode active material was 50 ppm.

Furthermore, the mass of aluminum to the mass of the particles of negative electrode active material was 150 ppm, and the mass of zirconium to the mass of the particles of negative electrode active material was 20 ppm.

Furthermore, from the negative electrode prepared as was described above and a counter electrode lithium, a test cell of a coin battery type of a 2032 size was prepared, and a discharge behavior thereof was evaluated. In more specifically, first, at the counter electrode Li, a constant current and a constant voltage charge was performed up to 0 V, and, at the time point where the current density reached 0.05 $mA/cm^2$, the charge was stopped. After that, constant current discharge was performed up to 1.2 V. The current density at this time was 0.2 $mA/cm^2$. The charge/discharge was repeated 30 times, from the data obtained in each charge/discharge, a graph was depicted with a capacity variation rate (dQ/dV) on a vertical axis and a voltage (V) on a horizontal axis, and whether the V may obtain a peak in the range of from 0.4 to 0.55 (V) was confirmed. As a result thereof, in Comparative Example 1 where x of $SiO_x$ is less than 0.5, the peak was not obtained. In other Examples and Comparative Examples, in charge/discharge within 30 times, the peak was obtained, and, in all charge/discharges until the 30$^{th}$ time from the charge/discharge where the peak appeared for the first time, the peak was obtained.

Results of the evaluation of Examples 1-1 to 1-3 and Comparative Examples 1-1 and 1-2 are shown in Table 1.

TABLE 1

$SiO_x$ $D_{50}$ = 4 μm, graphite (natural graphite: artificial graphite = 5:5) $D_{50}$ = 20 μm, $SiO_x$ ratio 10% by mass, $Li_2SiO_3$, $Li_4SiO_4$, carbon material average thickness 100 nm, with dQ/dV, half value width 2.257°, crystallite 3.77 nm, modification method: redox, A > B Ni 25 ppm, Cr 25 ppm, Al 150 ppm, Zr 20 ppm, with Al-Li alloy

|  | x | Capacity Retention Rate (%) | Initial Efficiency (%) |
|---|---|---|---|
| Comparative Example 1-1 | 0.3 | 46 | 88.3 |
| Example 1-1 | 0.5 | 80.1 | 86.9 |
| Example 1-2 | 1 | 81.0 | 87.5 |
| Example 1-3 | 1.6 | 80.2 | 87.0 |
| Comparative Example 1-2 | 1.8 | — | — |

As shown in Table 1, in the silicon compound expressed by $SiO_x$, when a value of x is outside of the range of $0.5 \leq x \leq 1.6$, the battery characteristics were degraded. For example, as shown in Comparative Example 1-1, when oxygen is not sufficient (x=0.3), the first time efficiency is improved, but the capacity retention rate is drastically degraded. On the other hand, as shown in Comparative Example 1-2, when an amount of oxygen is abundant (x=1.8), since the electric conductivity is degraded and the capacity of the silicon oxide is not substantially developed, the evaluation was stopped.

Example 2-1, Example 2-2

Each of secondary batteries was prepared under the same condition as in Example 1-2 except that the kind of the lithium silicate that is contained in the inside of the particles of silicon compound was changed as shown in Table 2, and the cycle characteristics and the first time efficiency were evaluated.

Comparative Example 2-1

A secondary battery was prepared under the same condition as in Example 1-2 except that lithium was not inserted into the particles of negative electrode active material, and the cycle characteristics and the first time efficiency were evaluated.

Results of Example 2-1, Example 2-2, and Comparative Example 2-1 are shown in Table 2.

TABLE 2

$SiO_x$ x = 1, $D_{50}$ = 4 μm, graphite (natural graphite: artificial graphite = 5:5) $D_{50}$ = 20 μm, $SiO_x$ ratio 10% by mass, carbon material average thickness 100 nm, with dQ/dV, half value width 2.257°, crystallite 3.77 nm, modification method: redox, A > B Ni 25 ppm, Cr 25 ppm, Al 150 ppm, Zr 20 ppm, with Al-Li alloy

|  | Lithium Silicate | Capacity Retention Rate (%) | Initial Efficiency (%) |
|---|---|---|---|
| Example 2-1 | $Li_2SiO_3$ | 80.0 | 86.5 |
| Example 2-2 | $Li_4SiO_4$ | 80.1 | 86.1 |
| Example 1-2 | $Li_2SiO_3$, $Li_4SiO_4$ | 81.0 | 87.5 |
| Comparative Example 2-1 | — | 78.0 | 82.5 |

When the silicon compound contains a stable lithium silicate such as $Li_2SiO_3$ and $Li_4SiO_4$, the capacity retention rate and initial efficiency were improved. In particular, when containing both of $Li_2SiO_3$ and $Li_4SiO_4$, the capacity retention rate and initial efficiency were more improved. On the other hand, in Comparative Example 2-1 where the modification was not applied and the lithium silicate was not contained, the capacity retention rate and initial efficiency were degraded.

Example 3-1 to Example 3-6, Comparative Example 3-1, 3-2

Each of secondary batteries was prepared under the same condition as in Example 1-2 except that the mass of nickel to the mass of the particles of negative electrode active material was changed as shown in Table 3, and the cycle characteristics and the first time efficiency were evaluated. The mass of nickel was adjusted by changing an amount of nickel added to the raw material.

TABLE 3

$SiO_x$ x = 1, $D_{50}$ = 4 μm, graphite (natural graphite: artificial graphite = 5:5) $D_{50}$ = 20 μm, $SiO_x$ ratio 10% by mass, $Li_2SiO_3$, $Li_4SiO_4$, carbon material average thickness 100 nm, with dQ/dV, half value width 2.257°, crystallite 3.77 nm, modification method: redox, A > B, Cr 25 ppm, Al 150 ppm, Zr 20 ppm, with Al-Li alloy

|  | Concentration of Nickel (mass ppm) | Capacity Retention Rate (%) | Initial Efficiency (%) |
|---|---|---|---|
| Comparative Example 3-1 | 1 | 75.0 | 85.5 |
| Example 3-1 | 2 | 79.0 | 87.1 |
| Example 3-2 | 20 | 80.0 | 87.3 |
| Example 1-2 | 25 | 81.0 | 87.5 |
| Example 3-3 | 40 | 81.3 | 87.8 |
| Example 3-4 | 60 | 81.5 | 88.0 |
| Example 3-5 | 80 | 80.2 | 87.2 |
| Example 3-6 | 100 | 79.1 | 87.0 |
| Comparative Example 3-2 | 110 | 76.0 | 85.3 |

From Table 3, the capacity retention rate and initial efficiency were improved when the mass of nickel in the particles of silicon compound is in the range of 2 mass ppm or more and 100 mass ppm or less to the mass of the particles of negative electrode active material like Examples 3-1 to 3-6. On the other hand, the capacity retention rate and initial efficiency were degraded in Comparative Examples 3-1 and 3-2 that are outside of the range.

Examples 4-1 to 4-3, Comparative Examples 4-1, 4-2

Each of secondary batteries was prepared under the same condition as in Example 1-2 except that a sum total of the mass of nickel and the mass of chromium to the mass of the particles of negative electrode active material was changed as shown in Table 4, and the cycle characteristics and the first time efficiency were evaluated. The sum total was adjusted by changing amounts of nickel and chromium added to the raw material.

TABLE 4

$SiO_x$ x = 1, $D_{50}$ = 4 μm, graphite (natural graphite: artificial graphite = 5:5) $D_{50}$ = 20 μm, $SiO_x$ ratio 10% by mass, $Li_2SiO_3$, $Li_4SiO_4$, carbon material average thickness 100 nm, with dQ/dV, half value width 2.257°, crystallite 3.77 nm, modification method: redox, A > B, Al 150 ppm, Zr 20 ppm, with Al-Li alloy

|  | Concentration of Nickel (mass ppm) | Concentration of Chromium (mass ppm) | Sum Total (mass ppm) | Capacity Retention Rate (%) | Initial Efficiency (%) |
| --- | --- | --- | --- | --- | --- |
| Comparative Example 4-1 | 0.5 | 0.5 | 1 | 79.7 | 86.9 |
| Comparative Example 4-2 | 1.0 | 1.0 | 2 | 80.0 | 87.2 |
| Example 1-2 | 25 | 25 | 50 | 81.0 | 87.5 |
| Example 4-1 | 37.5 | 37.5 | 75 | 81.3 | 87.6 |
| Example 4-2 | 50 | 50 | 100 | 80.7 | 87.4 |
| Example 4-3 | 55 | 55 | 110 | 80.1 | 87.0 |

As obvious from Table 4, the capacity retention rate and initial efficiency were more improved when the sum total is 2 mass ppm or more and 100 mass ppm or less.

Examples 5-1 to 5-5

Each of secondary batteries was prepared under the same condition as in Example 1-2 except that the mass of aluminum to the mass of the particles of negative electrode active material was changed as shown in Table 5, and the cycle characteristics and the first time efficiency were evaluated. The mass of aluminum was adjusted by changing an amount of aluminum added to the raw material.

TABLE 5

$SiO_x$ x = 1, $D_{50}$ = 4 μm, graphite (natural graphite: artificial graphite = 5:5) $D_{50}$ = 20 μm, $SiO_x$ ratio 10% by mass, $Li_2SiO_3$, $Li_4SiO_4$, carbon material average thickness 100 nm, with dQ/dV, half value width 2.257°, crystallite 3.77 nm, modification method: redox, A > B, Ni 25 ppm, Cr 25ppm, Zr 20 ppm, with Al-Li alloy

|  | Concentration of Aluminum (mass ppm) | Capacity Retention Rate (%) | Initial Efficiency (%) |
| --- | --- | --- | --- |
| Example 5-1 | 3 | 79.9 | 87.5 |
| Example 5-2 | 5 | 80.7 | 87.4 |
| Example 1-2 | 150 | 81.0 | 87.5 |
| Example 5-3 | 300 | 81.3 | 87.7 |
| Example 5-4 | 500 | 80.5 | 87.4 |
| Example 5-5 | 510 | 79.7 | 87.4 |

As obvious from Table 5, the cycle characteristics were more improved when the mass of aluminum to the mass of the particles of negative electrode active material is 5 mass ppm or more and 500 mass ppm or less.

Example 6-1

A secondary battery was prepared under the same condition as in Example 1-2 except that the particles of silicon compound active material that do not contain the aluminum-lithium alloy were used, and the cycle characteristics and the first time efficiency were evaluated. At this time, aluminum was not added to the raw material.

In Example 6-1, in order to measure the stability of the negative electrode mixture slurry, a part of the prepared negative electrode mixture slurry was sampled by 30 g separately from the slurry for preparation of the secondary battery, stocked at 20° C., and at 6 hours, 24 hours, 48 hours, 72 hours, and one week after the preparation of the negative electrode mixture slurry, gas generation states were confirmed.

Furthermore, the stability of the negative electrode mixture slurry prepared in Example 1-2 was also measured by the same procedure, and compared with Example 6-1.

TABLE 6

$SiO_x$ x = 1, $D_{50}$ = 4 μm, graphite (natural graphite: artificial graphite = 5:5) $D_{50}$ = 20 μm, $SiO_x$ ratio 10% by mass, $Li_2SiO_3$, $Li_4SiO_4$, carbon material average thickness 100 nm, with dQ/dV, half value width 2.257°, crystallite 3.77 nm, modification method: redox, A > B, Ni 25 ppm, Cr 25 ppm, Zr 20 ppm

|  | Aluminum-lithium Alloy | Capacity Retention Rate (%) | Initial Efficiency (%) | Time up to Gas Generation (Hours) |
| --- | --- | --- | --- | --- |
| Example 6-1 | No | 79.0 | 87.3 | 6 |
| Example 1-2 | Yes | 81.0 | 87.5 | 24 |

As obvious from Table 6, Example 1-2 took a longer time to generate the gas than in Example 6-1 in which the aluminum-lithium alloy is not contained, since Example 1-2 contains the particles of silicon compound that contain the aluminum-lithium alloy.

Examples 7-1 to 7-9

Each of secondary batteries was prepared under the same condition as in Example 1-2 except that the mass of zirconium to the mass of the particles of negative electrode active material was changed as shown in Table 7, and the cycle characteristics and the first time efficiency were evaluated. The mass of zirconium was adjusted by changing an amount of zirconium added to the raw material.

TABLE 7

$SiO_x$ x = 1, $D_{50}$ = 4 μm, graphite (natural graphite: artificial graphite = 5:5) $D_{50}$ = 20 μm, $SiO_x$ ratio 10% by mass, $Li_2SiO_3$, $Li_4SiO_4$, carbon material average thickness 100 nm, with dQ/dV, half value width 2.257°, crystallite 3.77 nm, modification method: redox method, A > B, Ni 25 ppm, Cr 25 ppm, Al 150 ppm, with Al-Li alloy

| | Concentration of Zirconium (mass ppm) | Capacity Retention Rate (%) | Initial Efficiency (%) |
|---|---|---|---|
| Example 7-1 | 0.2 | 78.5 | 87.3 |
| Example 7-2 | 0.5 | 80.2 | 87.4 |
| Example 7-3 | 10 | 80.9 | 87.4 |
| Example 1-2 | 20 | 81.0 | 87.5 |
| Example 7-4 | 70 | 81.5 | 87.6 |
| Example 7-5 | 100 | 81.3 | 87.4 |
| Example 7-6 | 110 | 80.5 | 87.3 |
| Example 7-7 | 250 | 80.1 | 87.2 |
| Example 7-8 | 500 | 79.0 | 87.4 |
| Example 7-9 | 510 | 78.6 | 87.5 |

As shown in Table 7, the cycle characteristics may be further improved, when the mass of zirconium relative to the mass of the particles of negative electrode active material is 0.5 mass ppm or more and 500 mass ppm or less. Furthermore, the cycle characteristics may be particularly improved, when the mass of zirconium relative to the mass of the particles of negative electrode active material is 10 mass ppm or more and 100 mass ppm or less.

Examples 8-1 to 8-9

Each of secondary batteries was prepared under the same condition as in Example 1-2 except that the crystallinity of the particles of silicon compound was changed as shown in Table 8, and the cycle characteristics and the first time efficiency were evaluated. By the way, the crystallinity of the particles of silicon compound may be controlled by change of a vaporization temperature of the raw material, or heat treatment after generation of the particles of silicon compound. In Example 8-9, although the half value width was calculated as 20° or more, this is a result obtained by fitting by means of an analytical soft, and the peak is not substantially obtained. Accordingly, the silicon compound of Example 8-9 may be said as substantially amorphous.

TABLE 8

$SiO_x$ x = 1, $D_{50}$ = 4 μm, graphite (natural graphite: artificial graphite = 5:5) $D_{50}$ = 20 μm, $SiO_x$ ratio 10% by mass, $Li_2SiO_3$, $Li_4SiO_4$, carbon material average thickness 100 nm, with dQ/dV, modification method: redox, A > B, Ni 25 ppm, Cr 25 ppm, Al 150 ppm, Zr 20 ppm, with Al-Li alloy

| | Half Value Width (°) | Si (111) Crystallite Size (nm) | Capacity Retention Rate (%) | Initial Efficiency (%) |
|---|---|---|---|---|
| Example 8-1 | 0.756 | 11.42 | 78.5 | 87.6 |
| Example 8-2 | 0.796 | 10.84 | 78.8 | 87.4 |
| Example 8-3 | 1.025 | 8.55 | 79.0 | 87.5 |
| Example 8-4 | 1.218 | 7.21 | 79.0 | 87.5 |
| Example 8-5 | 1.271 | 6.63 | 79.0 | 87.6 |
| Example 8-6 | 1.845 | 4.62 | 80.0 | 87.4 |
| Example 1-2 | 2.257 | 3.77 | 81.0 | 87.5 |
| Example 8-7 | 2.593 | 3.29 | 81.5 | 87.4 |
| Example 8-8 | 10.123 | 1.524 | 82.0 | 87.5 |
| Example 8-9 | 20.221 | 0 | 82.3 | 87.4 |

A high capacity retention rate was obtained in particular with a low crystalline material having the half value width of 1.2° or more and the crystallite size due to the Si(111) of 7.5 nm or less. Among these, the most excellent characteristics were obtained when the silicon compound is amorphous.

Example 9-1

A secondary battery was prepared under the same conditions as in Example 1-2 except that the silicon compound in which a relationship between a maximum peak intensity value A in the Si and silicate region and a peak intensity value B derived from the $SiO_2$ region is A<B was used, and the cycle characteristics and first time efficiency were evaluated. In this case, by reducing an insertion amount of lithium during modification, an amount of $Li_2SiO_3$ was reduced, thus, the intensity A of the peak derived from $Li_2SiO_3$ was made smaller.

TABLE 9

$SiO_x$ x = 1, $D_{50}$ = 4 μm, graphite (natural graphite: artificial graphite = 5:5) $D_{50}$ = 20 μm, $SiO_x$ ratio 10% by mass, $Li_2SiO_3$, $Li_4SiO_4$, carbon material average thickness 100 nm, with dQ/dV, half value width 2.257°, crystallite 3.77 nm, modification method: redox, Ni 25 ppm, Cr 25 ppm, Al 150 ppm, Zr 20 ppm, with Al-Li alloy

| | A · B | Capacity Retention Rate (%) | Initial Efficiency (%) |
|---|---|---|---|
| Example 9-1 | A < B | 80.0 | 85.8 |
| Example 1-2 | A > B | 81.0 | 87.5 |

As obvious from Table 9, the battery characteristics were improved when the relationship of the peak intensities satisfies A>B.

Example 10-1

A secondary battery was prepared under the same conditions as in Example 1-2 except that a negative electrode active material that, in a V-dQ/dV curve obtained by 30 times of charge/discharge in the test cell, could not obtain a peak in the range of 0.40 to 0.55 V of V was used, and the cycle characteristics and first time efficiency were evaluated.

TABLE 10

$SiO_x$ x = 1, $D_{50}$ = 4 μm, graphite (natural graphite: artificial graphite = 5:5) $D_{50}$ = 20 μm, $SiO_x$ ratio 10% by mass, $Li_2SiO_3$, $Li_4SiO_4$, carbon material average thickness 100 nm, half value width 2.257°, crystallite 3.77 nm, modification method: redox, A > B Ni 25 ppm, Cr 25ppm, Al 150 ppm, Zr 20 ppm, with Al-Li alloy

|  | dQ/dV Peak | Capacity Retention Rate (%) | Initial Efficiency (%) |
|---|---|---|---|
| Example 10-1 | No | 80.0 | 87.0 |
| Example 1-2 | Yes | 81.0 | 87.5 |

In order for a discharge curve shape to rise up more sharply, it is necessary to show the same discharge behavior as the Si (Si) in the silicon compound ($SiO_x$). Since the silicon compound that does not develop a peak in the above range by the 30 times of charge/discharge becomes a relatively mild discharge curve, the initial efficiency was slightly degraded when the secondary battery is formed. A stable bulk was formed when the silicon compound that develops a peak within 30 times of charge/discharge was used, and the capacity retention rate and initial efficiency were improved.

Example 11-1 to 11-6

Each of secondary batteries was prepared under the same conditions as in Example 2-1 except that the median diameter of the silicon compound was changed as shown in Table 11, and the cycle characteristics and first time efficiency were evaluated.

TABLE 11

$SiO_x$ x = 1, graphite (natural graphite: artificial graphite = 5:5) $D_{50}$ = 20 μm, $SiO_x$ ratio 10% by mass, $Li_2SiO_3$, $Li_4SiO_4$, carbon material average thickness 100 nm, with dQ/dV, half value width 2.257°, crystallite 3.77 nm, modification method: redox, A > B Ni 25 ppm, Cr 25 ppm, Al 150 ppm, Zr 20 ppm, with Al-Li alloy

|  | Median Diameter (μm) | Capacity Retention Rate (%) | Initial Efficiency (%) |
|---|---|---|---|
| Example 11-1 | 0.1 | 78.9 | 87.1 |
| Example 11-2 | 0.5 | 80.0 | 87.2 |
| Example 11-3 | 1 | 80.5 | 87.3 |
| Example 1-2 | 4 | 81.0 | 87.5 |
| Example 11-4 | 10 | 80.5 | 87.6 |
| Example 11-5 | 15 | 80.5 | 87.6 |
| Example 11-6 | 20 | 79.0 | 87.3 |

The retention rate was improved when the median diameter of the silicon compound is 0.5 μm or more. This is considered that an area by which the side reaction occurs could be reduced because a surface area a mass of the silicon compound is not excessively large. On the other hand, when the median diameter is 15 μm or less, the particles are difficult to be cracked during charge and an SEI (solid electrolyte interface) due to a new surface is difficult to be generated during the charge/discharge, therefore, the loss of reversible Li may be suppressed. Furthermore, physical and electric breakdown of the negative electrode active material layer due to the expansion may be prevented because an amount of expansion of the particles of silicon compound do not become large during charge when the median diameter of the particles of silicon compound is 15 μm or less.

Examples 12-1 to 12-4

Each of secondary batteries was prepared under the same conditions as in Example 2-1 except that an average thickness of the carbon material coated on a surface of the particles of silicon compound was changed, and the cycle characteristics and first time efficiency were evaluated. The average thickness of the carbon material may be adjusted by changing the CVD condition.

TABLE 12

$SiO_x$ x = 1, $D_{50}$ = 4 μm, graphite (natural graphite: artificial graphite = 5:5) $D_{50}$ = 20 μm, $SiO_x$ ratio 10% by mass, $Li_2SiO_3$, $Li_4SiO_4$, with dQ/dV, half value width 2.257°, crystallite 3.77 nm, modification method: redox, A > B Ni 25 ppm, Cr 25 ppm, Al 150 ppm, Zr 20 ppm, with Al-Li alloy

|  | Average Thickness (nm) | Capacity Retention Rate (%) | Initial Efficiency (%) |
|---|---|---|---|
| Example 12-1 | 5 | 79.3 | 87.1 |
| Example 12-2 | 10 | 80.9 | 87.4 |
| Example 1-2 | 100 | 81.0 | 87.5 |
| Example 12-3 | 1000 | 81.2 | 87.6 |
| Example 12-4 | 5000 | 81.1 | 87.6 |

As obvious from Table 12, the capacity retention rate and initial efficiency may be improved, because the electric conductivity is particularly improved at the film thickness of the carbon layer of 10 nm or more. On the other hand, when the film thickness of the carbon layer is 50 nm or less, the battery capacity is not degraded because, from the viewpoint of battery design, an amount of the particles of silicon compound may be sufficiently secured.

Example 13-1

A secondary battery was prepared under the same conditions as in Example 1-2 except that the modification method was changed to a thermal doping method, and the cycle characteristics and first time efficiency were evaluated.

TABLE 13

$SiO_x$ x = 1, $D_{50}$ = 4 μm, graphite (natural graphite: artificial graphite = 5:5) $D_{50}$ = 20 μm, $SiO_x$ ratio 10% by mass, $Li_2SiO_3$, $Li_4SiO_4$, carbon material average thickness 100 nm, with dQ/dV, A > B Ni 25 ppm, Cr 25 ppm, Al 150 ppm, Zr 20 ppm, with Al-Li alloy

|  | Half Value Width (°) | Si (111) Crystallite Size (nm) | Modification Method | Capacity Retention Rate (%) | Initial Efficiency (%) |
|---|---|---|---|---|---|
| Example 13-1 | 1.755 | 4.86 | Thermal doping | 80.2 | 87.5 |
| Example 1-2 | 2.257 | 3.77 | Redox | 81.0 | 87.5 |

Excellent battery characteristics were obtained even when the thermal doping method was used. Furthermore, the crystallinity of the particles of silicon compound was also changed by heating. Any modification method could obtain excellent capacity retention rate and initial efficiency.

Example 14-1

A secondary battery was prepared under the same conditions as in Example 1-2 except that a ratio of the mass of the particles of silicon compound in the negative electrode active material was changed, and an increase rate of the battery capacity was evaluated.

In FIG. 5, a graph showing a relationship between a rate of the particles of silicon-based active material to a sum total of the negative electrode active material and an increase rate of battery capacity of the secondary battery is shown. A graph shown by A in FIG. 5 shows an increase rate of the battery capacity when a rate of the particles of silicon compound is increased in the negative electrode active material of a negative electrode of the present disclosure. On the other hand, a graph shown by B in FIG. 5 shows an increase rate of the battery capacity when the rate of the particles of silicon compound in which Li is not doped is increased. As obvious from FIG. 5, when the rate of the silicon compound is 6% by mass or more, the increase rate of the battery capacity becomes larger than ever, the volume energy density particularly remarkably increases.

By the way, it is to be noted that the present disclosure is not limited to the foregoing embodiment. The embodiment is just an exemplification, and any of examples that have substantially the same feature and demonstrate the same functions and effects as those in the technical concept described in claims of the present disclosure are included in the technical scope of the present disclosure.

The invention claimed is:

1. A negative electrode active material comprising:
   particles of negative electrode active material,
   wherein:
   the particles of negative electrode active material contain particles of silicon compound;
   the particles of silicon compound contain:
   (i) a silicon compound ($SiO_x$:0.5≤x≤1.6);
   (ii) at least one or more kinds of $Li_2SiO_3$ and $Li_4SiO_4$;
   (iii) nickel, a mass of the nickel to a mass of the particles of negative electrode active material is 2 mass ppm or more and 100 mass ppm or less; and
   (iv) aluminum in a form of an aluminum-lithium alloy in at least a part of inside of the particles of silicon compound, a mass of the aluminum to the mass of the particles of negative electrode active material is 5 mass ppm or more and 500 mass ppm or less.

2. The negative electrode active material according to claim 1,
   wherein the particles of silicon compound further contain chromium; and
   a sum total of a mass of the nickel and a mass of the chromium to the mass of the particles of negative electrode active material is 2 mass ppm or more and 100 mass ppm or less.

3. The negative electrode active material according to claim 1, wherein the particles of silicon compound further contain zirconium, and a mass of the zirconium to the mass of the particles of negative electrode active material is 0.5 mass ppm or more and 500 mass ppm or less.

4. The negative electrode active material according to claim 3, wherein the mass of the zirconium to the mass of the particles of negative electrode active material is 10 mass ppm or more and 100 mass ppm or less.

5. The negative electrode active material according to claim 1, wherein the particles of silicon compound have a half value width (2θ) of a diffraction peak derived from a Si(111) crystal plane obtained by X-ray diffractometry of 1.2° or more and a crystallite size corresponding to the crystal plane of 7.5 nm or less.

6. The negative electrode active material according to claim 1, wherein the particles of silicon compound satisfy a relationship of A>B between a maximum peak intensity value A of Si and Li silicate regions provided in −60 to −95 ppm as a chemical shift value obtained from a $^{29}$Si-MAS-NMR spectrum and a peak intensity value B of a $SiO_2$ region provided in −96 to −150 ppm as the chemical shift value in the particles of silicon compound.

7. The negative electrode active material according to claim 1, wherein when a test cell formed of a negative electrode containing a mixture of the negative electrode active material and a carbon-based active material and a counter electrode lithium is prepared, in the test cell, charge/discharge formed of charge during which a current is flowed so as to insert lithium into the negative electrode active material and discharge during which the current is flowed so as to detach the lithium from the negative electrode active material is carried out 30 times, and a graph showing a relationship between a differential value dQ/dV obtained by differentiating a discharge capacity Q by a potential V of the negative electrode based on the counter electrode lithium and the potential V is depicted in each charge/discharge, the potential V of the negative electrode during discharges on or after X times (1≤X≤30) has a peak in the range of from 0.40 V to 0.55 V.

8. The negative electrode active material according to claim 1, wherein the particles of negative electrode active material have a median diameter of 1.0 μm or more and 15 μm or less.

9. The negative electrode active material according to claim 1 wherein the particles of negative electrode active material contain a carbon material on a superficial part.

10. The negative electrode active material according to claim 9, wherein an average thickness of the carbon material is 10 nm or more and 5000 nm or less.

11. The negative electrode active material according to claim 1, wherein the mass of the aluminum to the mass of the particles of negative electrode active material is 5 mass ppm or more and 150 mass ppm or less.

12. A mixed negative electrode active material comprising:
   the negative electrode active material according to claim 1 and a carbon-based active material.

13. A negative electrode for nonaqueous electrolyte secondary batteries comprising:
   the mixed negative electrode active material according to claim 12,
   wherein a ratio of a mass of the negative electrode active material relative to a sum total of masses of the negative electrode active material and the carbon-based active material is 6% or more.

14. A negative electrode for nonaqueous electrolyte secondary batteries comprising:
   a negative electrode active material layer formed with the mixed negative electrode active material according to claim 12; and
   a negative electrode current collector,
   wherein the negative electrode active material layer is formed on the negative electrode current collector; and the negative electrode current collector contains carbon and sulfur, and each content thereof is 100 mass ppm or less.

15. A lithium ion secondary battery comprising:
a negative electrode containing the negative electrode active material according to claim 1 as a negative electrode.

16. A method of producing a negative electrode active material containing particles of negative electrode active material containing particles of silicon compound comprising:
preparing the particles of negative electrode active material containing a silicon compound ($SiO_x$:0.5≤x≤1.6) containing particles of silicon compound, nickel, and aluminum;
inserting Li into the particles of negative electrode active material to make at least one or more kinds of $Li_2SiO_3$ and $Li_4SiO_4$, and form an aluminum-lithium alloy in at least a part of inside of the particles of silicon compound;
selecting, from the particles of negative electrode active material, particles of negative electrode active material that contain:
(a) the nickel of a mass of 2 mass ppm or more and 100 mass ppm or less relative to a mass of the particles of negative electrode active material, and
(b) the aluminum of a mass of 5 mass ppm or more and 500 mass ppm or less relative to the mass of the particles of negative electrode active material;
and
producing the negative electrode active material with the selected particles of negative electrode active material.

17. A production method of a lithium ion secondary battery comprising:
preparing a negative electrode using the negative electrode active material produced according to the production method of the negative electrode active material according to claim 16; and
producing a lithium ion secondary battery using the prepared negative electrode.

* * * * *